United States Patent
Suzuki et al.

(10) Patent No.: US 9,442,851 B2
(45) Date of Patent: Sep. 13, 2016

(54) MULTI-CORE PROCESSOR SYSTEM, CONTROL PROGRAM, AND CONTROL METHOD

(71) Applicant: FUJITSU LIMITED, Kawasaki-shi, Kanagawa (JP)

(72) Inventors: Takahisa Suzuki, Kawasaki (JP); Koichiro Yamashita, Hachioji (JP); Hiromasa Yamauchi, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/710,138

(22) Filed: May 12, 2015

(65) Prior Publication Data

US 2015/0242317 A1 Aug. 27, 2015

Related U.S. Application Data

(63) Continuation of application No. 13/720,018, filed on Dec. 19, 2012, now Pat. No. 9,052,993, which is a continuation of application No. PCT/JP2010/060576, filed on Jun. 22, 2010.

(51) Int. Cl.
*G06F 12/08* (2016.01)
*G06F 12/00* (2006.01)
(Continued)

(52) U.S. Cl.
CPC ........... *G06F 12/0811* (2013.01); *G06F 9/544* (2013.01); *G06F 12/00* (2013.01); *G06F 12/0808* (2013.01); *G06F 12/0833* (2013.01); *G06F 12/0842* (2013.01); *G06F 12/1072* (2013.01); *G06F 2212/1016* (2013.01); *G06F 2212/1044* (2013.01); *G06F 2212/283* (2013.01)

(58) Field of Classification Search
None
See application file for complete search history.

(56) References Cited

U.S. PATENT DOCUMENTS

| | | | |
|---|---|---|---|
| 5,287,508 A | 2/1994 | Hejna, Jr. et al. | |
| 5,535,372 A | 7/1996 | Benhase et al. | 711/100 |

(Continued)

FOREIGN PATENT DOCUMENTS

| | | |
|---|---|---|
| CN | 101131652 A | 2/2008 |
| JP | 1-251250 | 10/1989 |

(Continued)

OTHER PUBLICATIONS

Chinese Office Action dated Sep. 30, 2015 in corresponding Chinese Patent Application No. 201080067572.1.

(Continued)

*Primary Examiner* — Kevin Verbrugge
(74) *Attorney, Agent, or Firm* — Staas & Halsey LLP

(57) ABSTRACT

A multi-core processor system includes a memory unit that for each input destination thread defined as a thread to which given data is input, stores identification information of an assignment destination core for the input destination thread; and a multi-core processor that is configured to update, in the memory unit and when assignment of the input destination thread to a multi-core processor is detected, the identification information of the assignment destination core for the input destination thread; detect a writing request for the given data; identify based on the given data for which the writing request is detected, the updated identification information among information stored in the memory unit; and store the given data to a memory of the assignment destination core that is indicated in the updated identification information and among cores making up the multi-core processor.

2 Claims, 21 Drawing Sheets

(51) Int. Cl.
*G06F 9/54* (2006.01)
*G06F 12/10* (2016.01)

(56) References Cited

U.S. PATENT DOCUMENTS

| | | | |
|---|---|---|---|
| 5,778,436 | A | 7/1998 | Kedem et al. ............... 711/137 |
| 8,661,458 | B2 | 2/2014 | Sakai ........................... 719/321 |
| 8,667,490 | B1 | 3/2014 | van der Goot .............. 711/162 |
| 2004/0255323 | A1 | 12/2004 | Varadarajan et al. .......... 725/25 |
| 2007/0088916 | A1 | 4/2007 | Jacobson et al. |
| 2008/0126652 | A1 | 5/2008 | Vembu et al. ............... 710/268 |
| 2008/0155197 | A1 | 6/2008 | Li et al. |
| 2009/0106187 | A1 | 4/2009 | Ichino .............................. 707/1 |
| 2009/0199028 | A1 | 8/2009 | Arimilli et al. |
| 2010/0042787 | A1 | 2/2010 | Auernhammer et al. |
| 2011/0153924 | A1 | 6/2011 | Vash et al. .................. 711/105 |
| 2012/0017217 | A1 | 1/2012 | Umezawa et al. ........... 718/102 |
| 2013/0111138 | A1 | 5/2013 | Suzuki et al. ............... 711/122 |
| 2013/0111158 | A1 | 5/2013 | Suzuki et al. |
| 2013/0179666 | A1 | 7/2013 | Yamashita et al. .......... 712/228 |

FOREIGN PATENT DOCUMENTS

| | | |
|---|---|---|
| JP | 06-096039 | 4/1994 |
| JP | 11-39214 | 2/1999 |
| JP | 2007-241601 | 9/2007 |
| JP | 2008-152571 | 7/2008 |
| JP | 2009-512078 | 3/2009 |
| JP | 2009-238142 | 10/2009 |
| WO | 2011/161774 | 12/2011 |

OTHER PUBLICATIONS

International Search Report of PCT/JP2010/060576 mailed Oct. 5, 2010.
Japanese International Preliminary Report on Patentability mailed Jan. 24, 2013, issued in corresponding PCT Patent Application No. PCT/JP2010/060576.
*ARM®* Architecture Reference Manual (*ARM®*v7-A and *ARM®*v7-R edition), ARM Limited, initially published Apr. 2007, latest additions from Jul. 2009, 2158 total pages.
Extended European Search Report dated Oct. 27, 2014 in corresponding European Patent Application No. 10853634.3.
Office Action mailed Dec. 10, 2014 for corresponding Chinese Patent Application No. 201080067572.1.
Japanese Office Action for corresponding Japanese Patent Application No. 2014-059151, issued Jan. 20, 2015, 6 pages.
Guo et al. "Hierarchical Memory System Design for a Heterogeneous Multi-Core Processor." Proceedings of the 2008 ACM Symposium on Applied Computing (SAC '08), pp. 1504-1508.
Office Action mailed from the United Stated Patent and Trademark Office on Oct. 23, 2014 in the related U.S. Appl. No. 13/720,018.
Notice of Allowance mailed from the United Stated Patent and Trademark Office on Feb. 13, 2015 in the related U.S. Appl. No. 13/720,018.
U.S. Appl. No. 13/720,018, filed Dec. 19, 2012, Takahisa Suzuki et al., Fujitsu Limited.

FIG.8

| THREAD IDENTIFICATION INFORMATION FIELD (801) | ASSIGNMENT DESTINATION CPU IDENTIFICATION INFORMATION FIELD (802) | EXECUTION STATE FIELD (803) |
|---|---|---|
| THREAD 1 | - | - |
| THREAD 2 | - | - |
| ⋮ | ⋮ | ⋮ |

MULTI-CORE PROCESSOR SYSTEM, CONTROL PROGRAM, AND CONTROL METHOD

CROSS REFERENCE TO RELATED APPLICATIONS

This application is a continuation of and claims priority benefit to U.S. patent application Ser. No. 13/720,018, filed Dec. 19, 2012, allowed, which application in turn is a continuation based on and claims priority benefit to International Application PCT/JP2010/060576, filed on Jun. 22, 2010 and designating the U.S., the entire contents of which are incorporated herein by reference.

FIELD

The embodiments discussed herein are related to a multi-core processor system, a control program, and a control method that store data to a memory.

BACKGROUND

When a central processing unit (CPU) has a cache to which access is made faster than access made to a memory, data is stored to the cache when a CPU makes a data writing request. The CPU, therefore, can read the data out of the cache, thus achieve faster data reading.

In a multi-core processor system, the assignment of threads to CPUs is assigned is determined according to the assignment state of threads. If a given program includes data to be shared between multiple threads, the data may potentially be used by multiple CPUs. In the assignment of a thread in the multi-core processor, the thread is assigned to, for example, a CPU with the least load.

According to a known technique, when each CPU has a distributed cache in a multi-core processor system, data is stored in the distributed cache of each CPU when a data writing request is issued (first conventional technique). To maintain the consistency of data between distributed caches, a snoop process is executed. In the snoop process, when a change in a cache line is detected at the distributed cache of one CPU, the distributed cache of a different CPU is updated via a snoop bus.

Another technique is known in which data is saved to any one among distributed caches of a multi-core processor, and a CPU not storing data in the distributed cache thereof accesses the distributed cache of the CPU storing the data and reads out the data (second conventional technique) (see, e.g., Japanese Laid-Open Patent Publication No. H1-251250).

Still another technique is known where in a multi-core processor system, each CPU has a local memory and one CPU writes data to the local memory of a different CPU (see, e.g., Japanese Laid-Open Patent Publication No. H11-39214).

According to the second conventional technique, however, a CPU not storing data in its distributed cache must access a CPU storing the data in its distribute cache in order to read the data. Hence, the CPUs differ in the speed of access to the data. In other words, the second conventional technique poses a problem in that a CPU not storing data in its distributed cache has a lower data reading speed.

According to the first conventional technique, because data is stored in the distributed cache of each CPU, lower data reading speed, which is the case of the second conventional technique, does not result. It cannot be presupposed, however, that every CPU of the multi-core processor reads out data from the respective distributed cache thereof. The area of the distributed cache of the CPU may be occupied with unread data, which is a problem.

SUMMARY

According to an aspect of an embodiment, a multi-core processor system includes a memory unit that for each input destination thread defined as a thread to which given data is input, stores identification information of an assignment destination core for the input destination thread; and a multi-core processor that is configured to update, in the memory unit and when assignment of the input destination thread to a multi-core processor is detected, the identification information of the assignment destination core for the input destination thread; detect a writing request for the given data; identify based on the given data for which the writing request is detected, the updated identification information among information stored in the memory unit; and store the given data to a memory of the assignment destination core that is indicated in the updated identification information and among cores making up the multi-core processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is an explanatory diagram of one example of a thread management table 800;

DESCRIPTION OF EMBODIMENTS

Preferred embodiments of a multi-core processor system, a control program, and a control method according to the present invention will be described in detail. In the multi-core processor system of the embodiments, a multi-core processor is a processor equipped with multiple cores. Provided that the multi-core processor has multiple cores, the multi-core processor may be provided as a single processor equipped with multiple cores or as a group single-core processors in parallel. For simplicity, the embodiments will be described taking a group of single-core processor in parallel as an example.

Figure 1:
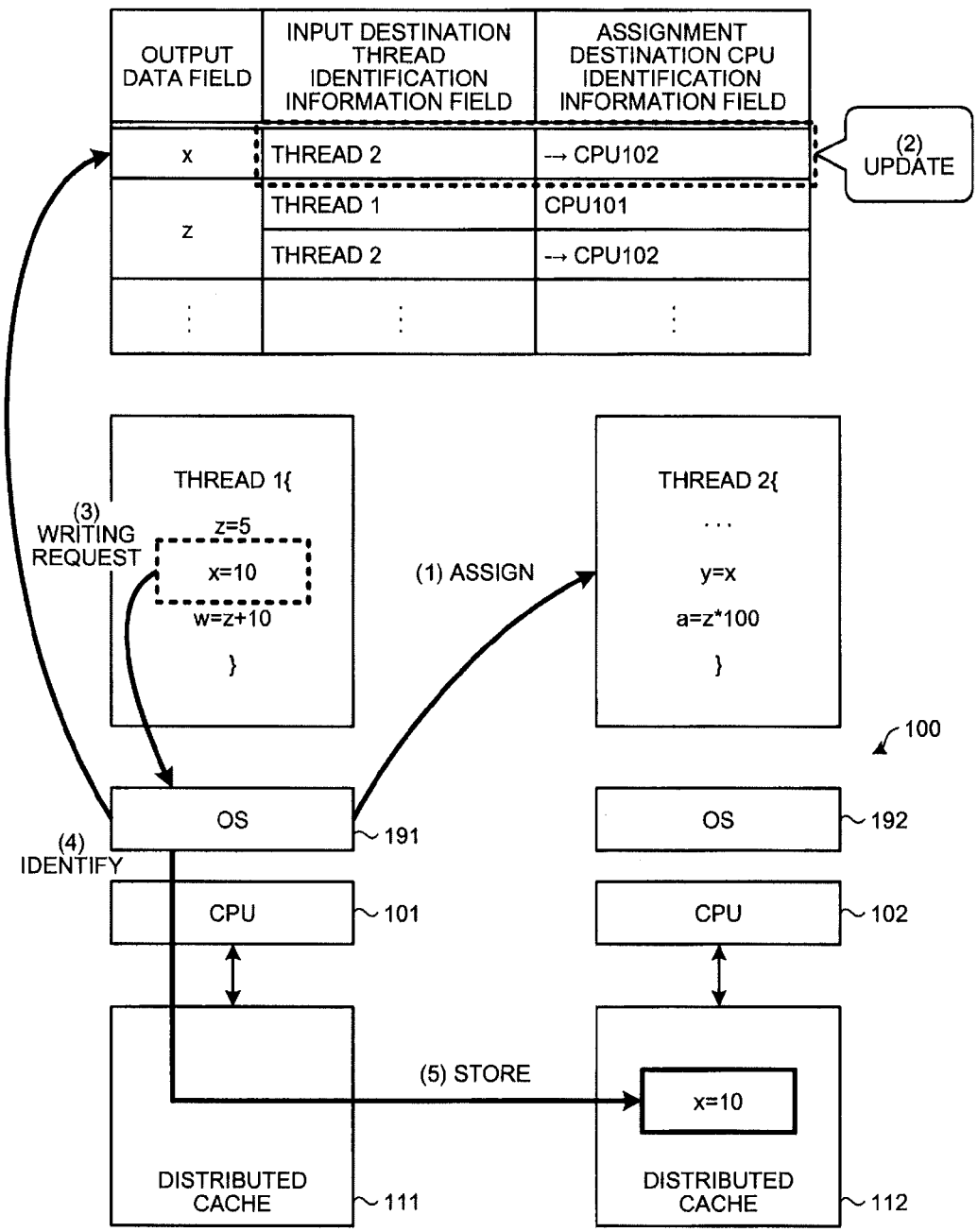
FIG. 1 is an explanatory diagram of one example of an embodiments.

FIG. 1 is an explanatory diagram of one example of an embodiment. In FIG. 1, a coding example of a thread 1 is described in a thread 1 { . . . } and a coding example of a thread 2 is described in a thread 2 { . . . }.

In the thread 1, 5 is substituted for a variable z and 10 is substituted for a variable x. Subsequently, in the thread 1, the result of summing the variable z and 10 is substituted for a variable w. Hence, in the thread 1, the variables x, z, and w are output data and the variable z is input data.

In the thread 2, the variable x is substituted for the variable y, and the result of summing the variable z and 100 is substituted for a variable a. Hence, in the thread 2, the variables y and a are output data and the variables x and z are input data.

An input destination thread for the variable x is the thread 2, and input destination threads for the variable z are the threads 1 and 2. A table has an output data field, an input destination thread field, and an assignment destination CPU identification information field. In the table, for each output data, an input destination thread for the output data and an assignment destination CPU for the input destination thread are described.

When a program having the threads 1 and 2 is developed, a developer of the program can identify output data and the thread to which the output data is input (input destination thread for the output data) by using a compiler. The assignment destination CPU for the input destination thread changes according to the assignment state of the threads 1 and 2.

The thread 1 is assigned to a CPU 101. As a result, when information in the output data field is "variable z" and information in the input destination thread identification information field is "thread 1", information in the assignment destination CPU identification information field is "CPU 101".

When an operating system (OS) 191 (1) assigns the thread 2 to a CPU, the OS 191 updates information in the assignment destination CPU identification information field in a case of information in the output data field being "variable z" and information in the input destination thread identification information field being "thread 2", to "CPU 102".

The OS 191 also (2) updates information in the assignment destination CPU identification information field in a case of information in the output data field being "variable x" and information in the input destination thread identification information field being "thread 2", to "CPU 102". In this example, assignment of the thread 2 is detected when the OS 191 assigns the thread 2 to the CPU 102.

When the OS 191 (3) detects a request for writing the variable x, the OS 191 (4) searches the table for information held in the assignment destination CPU identification information field, based on the variable x, to identify identification information of an assignment destination CPU. (5) Because the identified identification information of the assignment destination CPU indicates the CPU 102, the OS 191 stores the variable x in a distributed cache 112 of the CPU 102.

In this manner, given data is saved only in the cache of a CPU to which a thread using the given data as input data is assigned, among the caches of CPUs making up the multi-core processors. In other words, the given data is not stored in the cache of a CPU not requiring reading of the given data, so that the area of each cache can be utilized effectively without affecting the speed at which the input destination thread reads out the given data.

As described above, in thread assignment, the assignment of an input destination thread is determined according to the assignment state of CPUs. The cache of a CPU in which given data is stored, therefore, changes according to the assignment state of the input destination thread.

Figure 2:
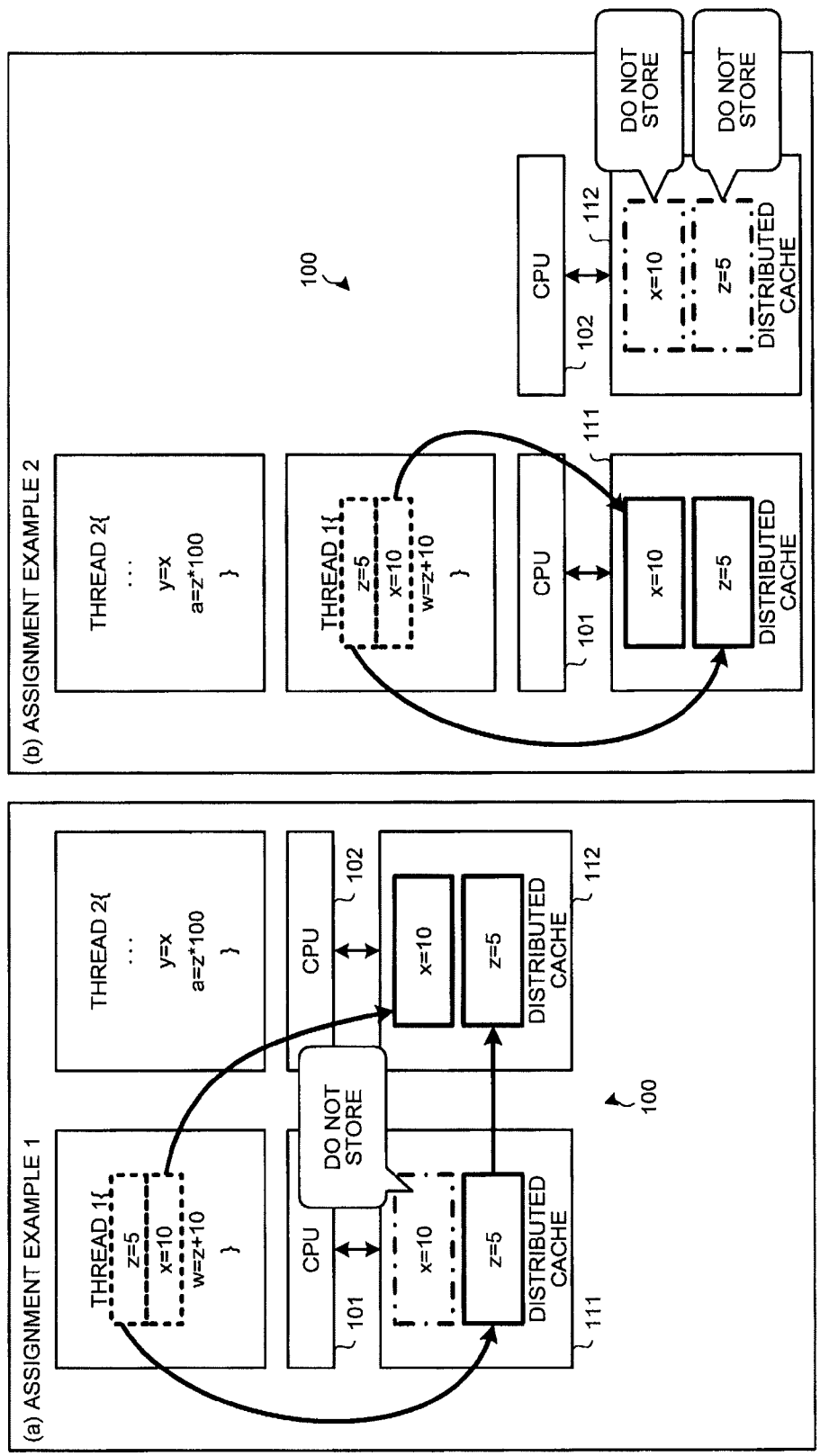
FIG. 2 is an explanatory diagram of examples of thread assignment.

FIG. 2 is an explanatory diagram of examples of thread assignment. In an assignment example 1 (a), the thread 1 is assigned to the CPU 101 and the thread 2 is assigned to the CPU 102, as in the example of FIG. 1. In an assignment example 2 (b), both threads 1 and 2 are assigned to the CPU 101.

In the assignment example 1 of the embodiments, among distributed caches 111 and 112, the variable x is stored in the distributed cache 112 and the variable z is stored in both of the distributed caches 111 and 112. In the assignment example 2 of the embodiments, the variable x is stored in the distributed cache 111 and the variable z is also stored in the distributed cache 111. According to the embodiments, an assignment destination CPU for an input destination thread for each output data is stored and updated to determine the distributed cache of a CPU to which the output data is stored.

An example of the embodiments will be described, in which example an assignment destination CPU for an input destination thread for each output data is managed using a memory management unit (MMU) and a thread management table.

Figure 3:
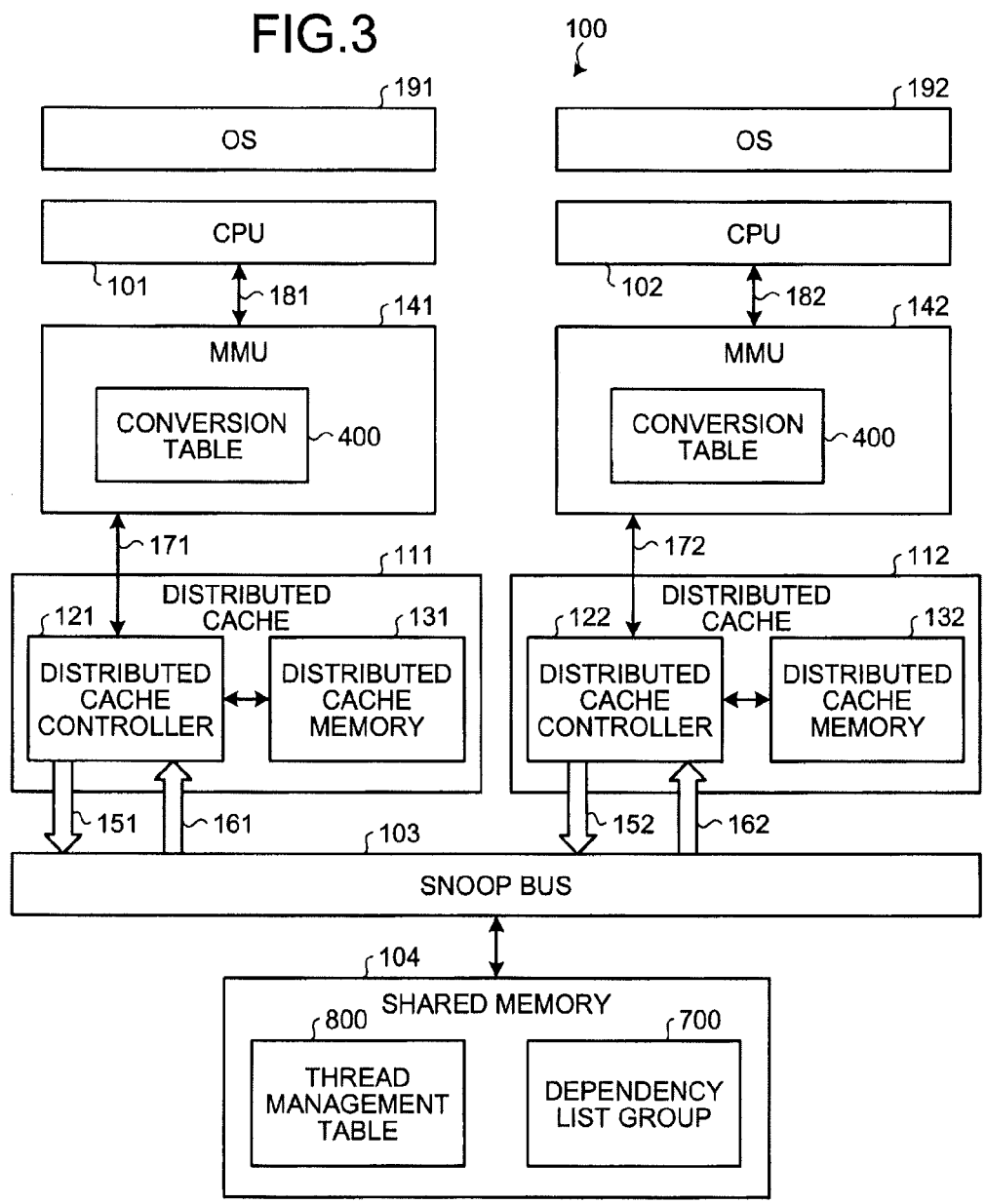
FIG. 3 is a block diagram of one example of hardware of a multi-core processor system 100.

FIG. 3 is a block diagram of one example of hardware of the multi-core processor system 100. In FIG. 3, the multi-core processor system 100 includes, for example, the CPUs 101 and 102, MMUs 141 and 142, the distributed caches 111 and 112, and a shared memory 104. In the embodiments, the CPUs 101 and 102 are collectively referred to as a multi-core processor.

The multi-core processor system 100 also includes, for example, an interface (I/F) connected to a network, such as the Internet, a display, and a keyboard 109, which are non-depicted components serving as input/output devices used by a user or connected to a different apparatus.

The CPU 101 is connected to the MMU 141 via an I/F 181, and the MMU 141 is connected to the distributed cache 111 (to a distributed cache controller 121) via an I/F 171. The CPU 102 is connected to the MMU 142 via an I/F 182, and the MMU 142 is connected to the distributed cache 112

(to a distributed cache controller 122) via an I/F 172. The distributed cache controller of each distributed cache is connected to the shared memory 104 via a snoop bus 103.

The CPU 101 and the CPU 102 each have a core and a register. The core is, for example, a circuit that realizes a computing function of the CPU. The CPU 101 serves as a master CPU, executing the OS 191 and performing overall control over the multi-core processor system 100. The OS 191 has a function of controlling to which CPU each thread of software is to be assigned and a function of controlling switching of a thread assigned to the CPU 101. The CPU 102 serves as a slave CPU, executing an OS 192. The OS 192 has a function of controlling switching of a thread assigned to the CPU 102.

The MMU 141 and the MMU 142 each has a function of converting a logical address accompanying an access request to a physical address, using a conversion table 400 when receiving the access request from the CPU 101 and the CPU 102. The MMU 141 and the MMU 142 may be incorporated in the CPU 101 and the CPU 102, respectively. While the MMUs 141 and 142 are provided as hardware in the multi-core processor system 100, the MMUs 141 and 142 may be provided as software serving as part of the functions of the OS 191 and the OS 192, respectively.

Figure 4:
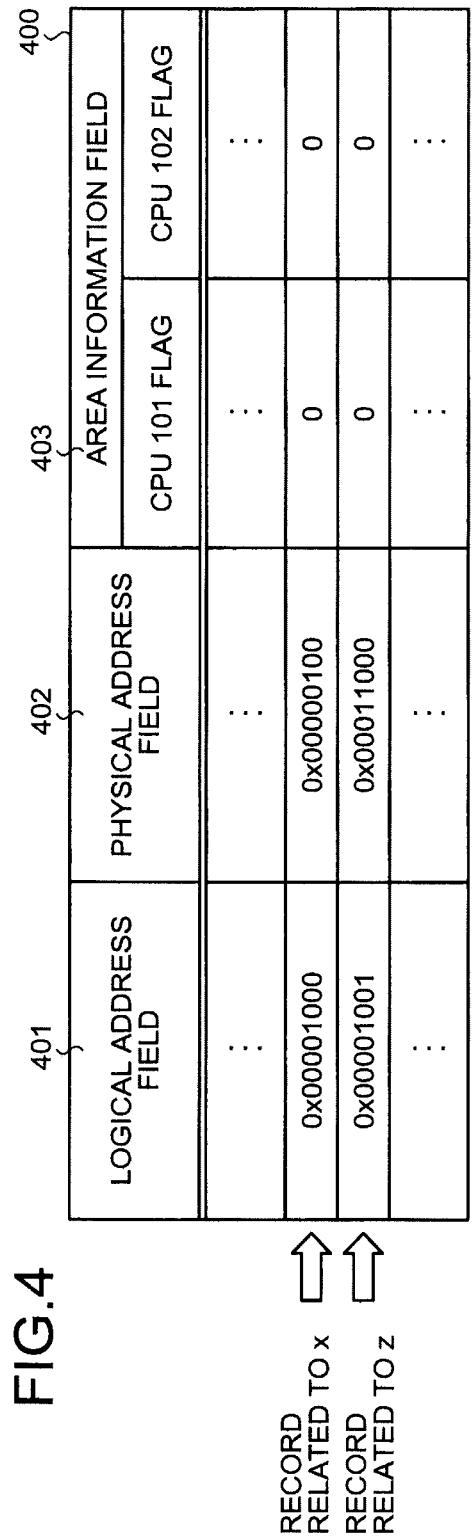
FIG. 4 is an explanatory diagram of one example of a conversion table 400.

FIG. 4 is an explanatory diagram of one example of the conversion table 400. A logical address is an address in a virtual memory space defined by program code, and a physical address is an address in the shared memory. The conversion table 400 has a physical address for each logical address; the physical address is obtained by mapping the logical address onto the shared memory. The conversion table 400 has a logical address field 401, a physical address field 402, and an area information field 403.

Because an access request sent from each CPU is accompanied by a logical address, a physical address can be identified by retrieving the logical address of the access request from information held in the logical address field 401 in the conversion table 400. The area information field 403 holds information that allows identification of an assignment destination CPU for an input destination thread for given data placed in a virtual memory space indicated by each logical address. The area information field 403 has a CPU flag corresponding to each CPU. The area information field 403 has a CPU 101 flag corresponding to the CPU 101 and a CPU 102 flag corresponding to the CPU 102.

For example, in the area information field 403, if the CPU 101 flag is 1 and the CPU 102 flag is 0, the assignment destination CPU for the input destination thread for the given data is the CPU 101. For example, in the area information field 403, if the CPU 101 flag is 0 and the CPU 102 flag is 1, the assignment destination CPU for the input destination thread for the given data is the CPU 101.

For the CPU 101 flag and the CPU 102 flag in the area information field 403, the OS 191 determines which flag to raise (to be set to 1) according to the assignment state of threads.

FIG. 3 is referred to again. In FIG. 3, the distributed cache 111 has a distributed cache controller 121 and a distributed cache memory 131. The distributed cache controller 121 controls the writing and reading of data with respect to the distributed cache memory 131. The distributed cache controller 112 has a distributed cache controller 122 and a distributed cache memory 132. The distributed cache controller 122 controls the writing and reading of data with respect to the distributed cache memory 132.

The distributed cache controller 121 of the distributed cache 111 delivers a physical address, data, and command information to the snoop bus 103 via a master I/F 151. The distributed cache controller 121 receives a physical address, data, and command information from the snoop bus 103 via a slave I/F 161. The distributed cache controller 122 of the distributed cache 112 delivers a physical address, data, and command information to the snoop bus 103 via a master I/F 152. The distributed cache controller 121 receives a physical address, data, and command information from the snoop bus 103 via a slave I/F 162.

Figure 5:
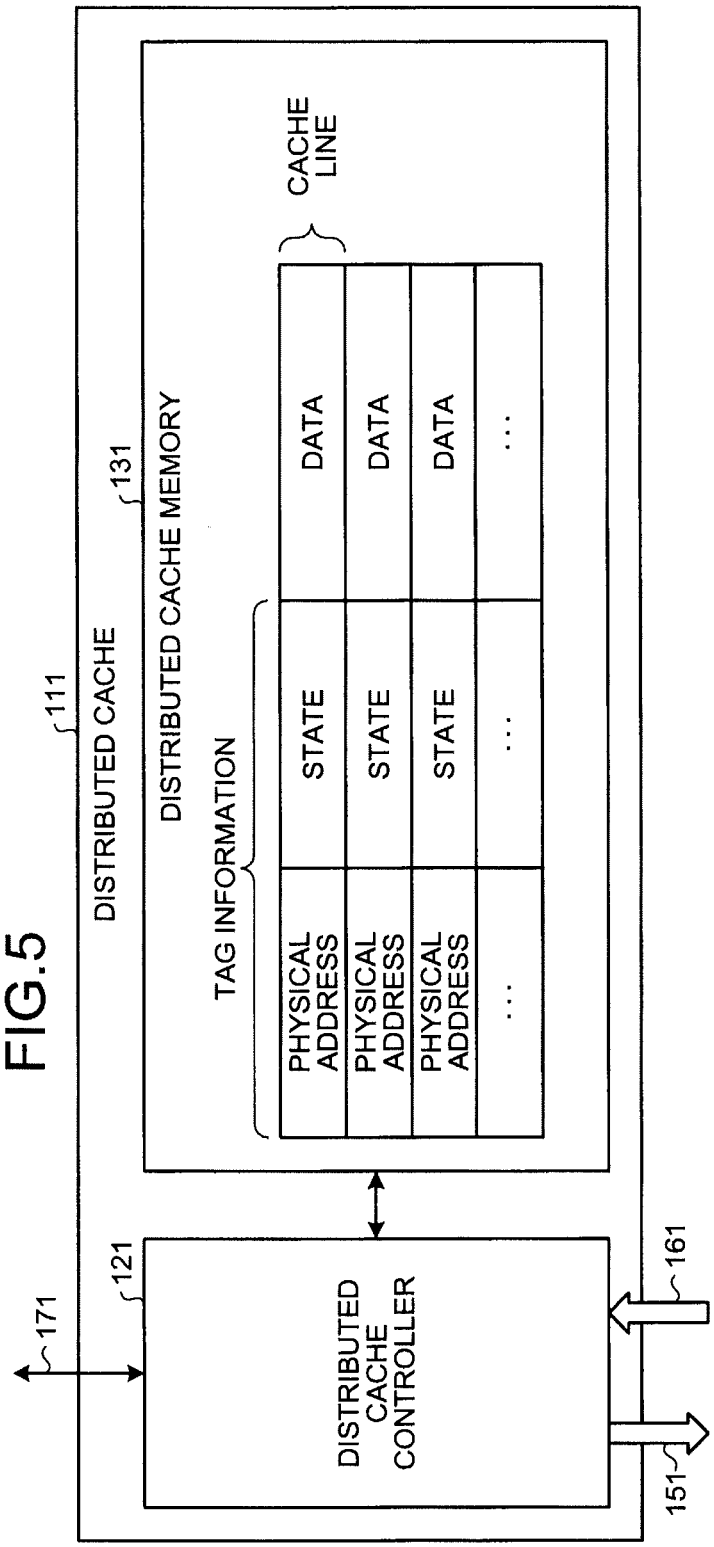
FIG. 5 is an explanatory diagram of a detailed example of a distributed cache 111.

FIG. 5 is an explanatory diagram of a detailed example of the distributed cache 111. As described above, the distributed cache 111 has the distributed cache controller 121 and the distributed cache memory 131. The distributed cache memory 131 stores a physical address, STATE, and data, for each data.

In the distributed cache memory 131, the physical address and STATE are collectively referred to as tag information and the tag information and data are collectively referred to as a cache line. The distributed cache controller 121 can determine whether given data is stored in the distributed cache memory 131, based on a physical address accompanying a request for access to the given data from the MMU 141 or the snoop bus 103.

STATE will be described. STATE is 2-bit information, and a value for STATE determines the state that each cache line is in. This state varies depending on a protocol that realizes a snoop method. The following four states are given as typical states.

Modified (M) state: A state indicating that the cache line is present only in the corresponding cache and is changed
Exclusive (E) state: A state indicating that the cache line is present only in the corresponding cache and is not changed
Shared (S) state: A state indicating that the cache line is present in multiple caches
Invalid (I) state: A state indicating that the cache line is invalid The distributed cache controller 121 operates according to the four states. Operation of the distributed cache controller 121 will be described later with reference to flowcharts of FIGS. 17 and 18. The distributed cache 112 is identical in function to the distributed cache 111, and is therefore omitted in further description.

FIG. 3 is referred to again. In FIG. 3, the snoop bus 103 is a bus that connects the shared memory 104 to the distributed caches and that is used for a snoop process.

Figure 6:
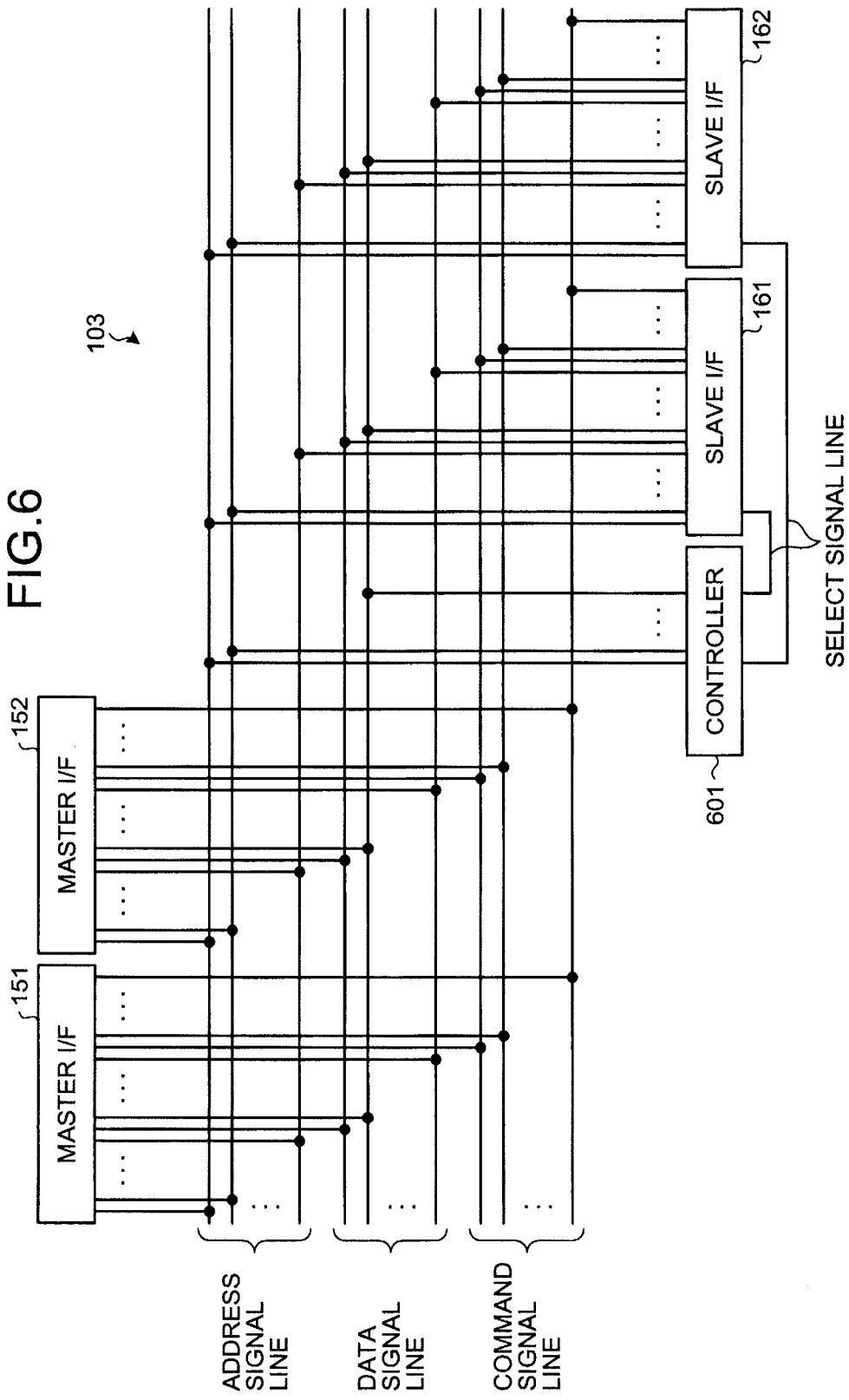
FIG. 6 is an explanatory diagram of a detailed example of a snoop bus 103.

FIG. 6 is an explanatory diagram of a detailed example of the snoop bus 103. In FIG. 6, each line represents a single physical signal line, and black circles represent connection between signal lines. The snoop bus 103 has address signal lines, command signal lines, data signal lines, a controller 601, and select signal lines. The snoop bus 103 receives signals from master I/Fs 151 and 152 and slave I/Fs 161 and 162.

The master I/Fs 151 and 152, for example, each sends a physical address to the address signal lines and sends command information indicating whether a signal is a reading request or writing request to the command signal lines. The sent physical address is received by the controller 601.

The controller 601 outputs a select signal to a select signal line leading to the corresponding slave I/F, based on the physical address and mapping information pre-registered with the controller 601. Receiving the select signal, the slave I/F also receives the physical address and the command information from the master I/F 151 and 152, and performs data exchange according to the command information.

The snoop bus 103 has, for example, three functions of broadcasting, blocking, and invalidating. Broadcasting is a function of sending a request for a combination of command information and data information from the master I/F to every slave I/F set in advance as a broadcasting destination. Blocking is a function of forcibly canceling the current bus connection. Invalidating is a function of invalidating a cache line corresponding to a subject physical address for each distributed cache memory. Using these functions, the snoop bus 103 exerts a function that the snoop bus 103 is required to have as a cache coherence mechanism.

FIG. 3 is referred to again. In FIG. 3, the shared memory 104 is memory shared by the CPU 101 and the CPU 102. The shared memory 104 includes, for example, read only memory (ROM), random access memory (RAM), flash ROM, etc. The shared memory 104 stores, for example, a thread management table 800, boot programs for the OSs 191 and 192, a control program, which will be described later, application programs, and a dependency list group 700.

For example, the ROM or flash ROM stores the above programs, etc., and the RAM is used as a work area by the CPUs 101 and 102. The OSs 191 and 192 stored in the shared memory 104 are loaded onto the CPUs 101 and 102, respectively, to cause the CPUs to execute a coded process.

Figure 7:
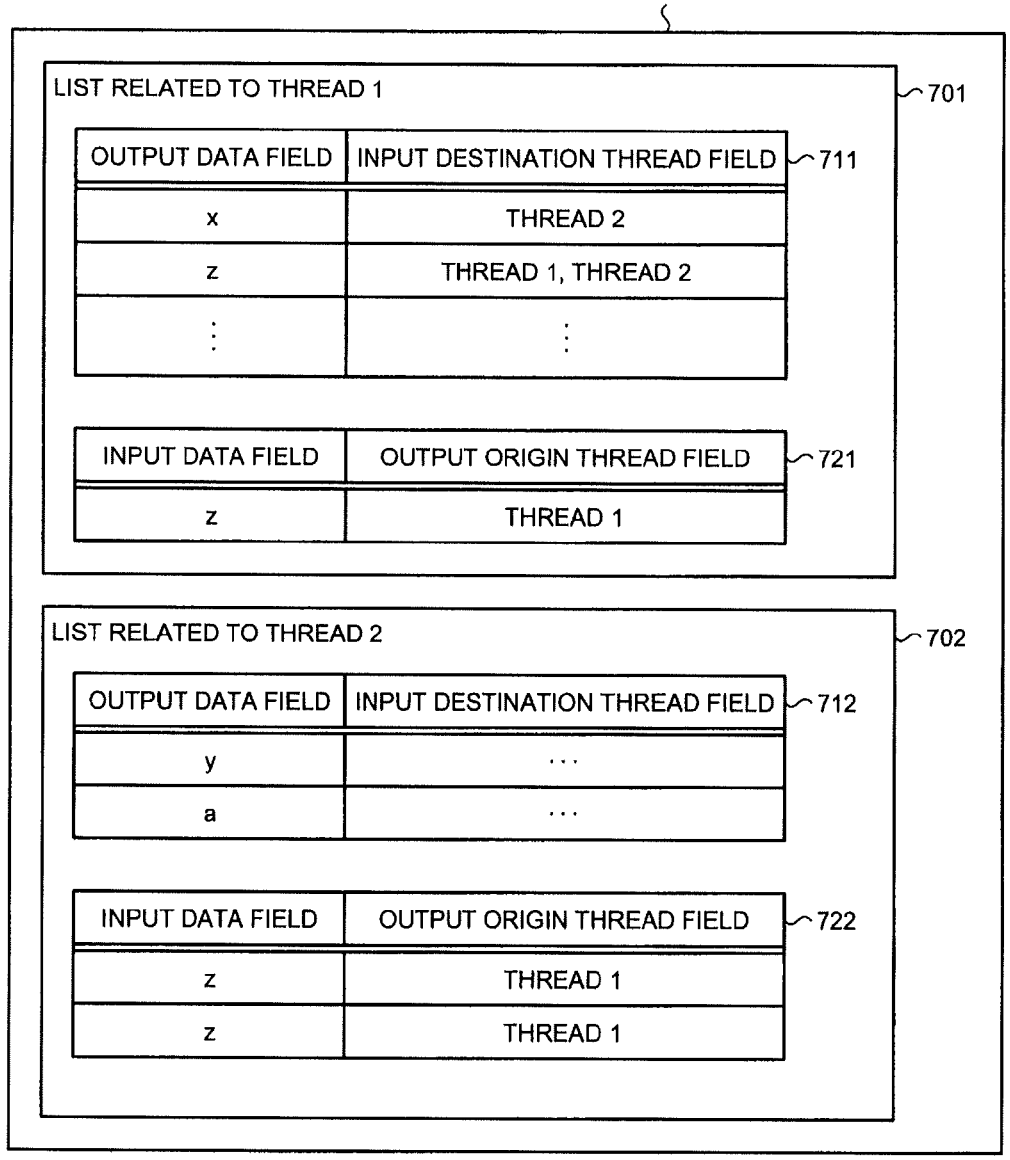
FIG. 7 is an explanatory diagram of one example of a dependency list group 700.

FIG. 7 is an explanatory diagram of one example of the dependency list group 700. The dependency list group 700 has, for each thread, information of output data in the thread and of an input destination thread for the output data and information of input data in the thread and an output origin thread for the input data.

A list 701 related to the thread 1 includes an output table 711 and an input table 721, and a list 702 related to the thread 2 has an output table 712 and an input table 722. The output table 711 has an output data field and an input destination thread field. In the output table 711, for each data held in the output data field, an input destination thread for the data is held in the input destination thread field. The input table 721 has an input data field and an output origin thread field. In the input table 721, for each data held in the input data field, an output origin thread for the data is held in the output origin thread field.

The output table 712 has an output data field and an input destination thread field. In the output table 712, for each data held in the output data field, an input destination thread for the data is held in the input destination thread field. The input table 722 has an input data field and an output origin thread field. In the input table 722, for each data held in the input data field, an output origin thread for the data is held in the output origin thread field.

Lists related to dependency among threads are, for example, made by a designer of a program, who analyzes each data in the program using a compiler.

FIG. 8 is an explanatory diagram of one example of the thread management table 800. In the thread management table 800, for each thread, the assignment state and the execution state of the thread are described. The thread management table 800 has a thread identification information field 801, an assignment destination CPU identification information field 802, and an execution state field 803.

For example, when the OS 191 receives an instruction to start a program, the OS 191 enters identification information of all threads in the program into the thread identification information field 801 in the thread management table 800. When determining an assignment destination CPU for each thread, the OS 191 enters identification information of the assignment destination CPU into the assignment destination CPU identification information field 802 in the thread management table 800. A thread for which "-" is entered in the assignment destination CPU identification information field 802 is a thread for which an assignment destination CPU is not determined.

Execution state indicates whether a thread is being executed, has not been assigned (indicated by "-" in FIG. 8), or is in a ready-queue and standing by. For example, when the OS 191 or 192 performs task switching, the OS rewrites the execution state in the execution state field 803 for the thread switched by the task switching. In FIG. 8, identification information of an assignment destination CPU held in the assignment destination CPU identification information field 802 for the threads 1 and 2 is "-" and the execution state held in the execution state field 803 for the threads 1 and 2 is "-".

The thread management table 800 stored in the shared memory 104 may also be stored in each of the distributed cache memories, in which case, when the contents of the thread management table 800 in any one of the distributed cache memories changes, the snoop process is executed through the snoop bus 103.

FIG. 3 is referred to again to explain the display, the I/F connected to a network, etc., and the keyboard. The display displays a cursor, icons, toolboxes, and data of documents, images, functional information, etc. For example, a TFT liquid crystal display, etc., may be adopted as the display.

The I/F is connected to a network, such as a local area network (LAN), wide area network (WAN), and the Internet, via a communication line and is connected to a different apparatus via the network. For example, a modem, LAN adaptor, etc., may be adopted as the I/F. The keyboard has keys for entering numerals, various instructions, etc., and is used to input data. The keyboard may be provided as a touch panel type input pad or numeric keypad.

Figure 9:
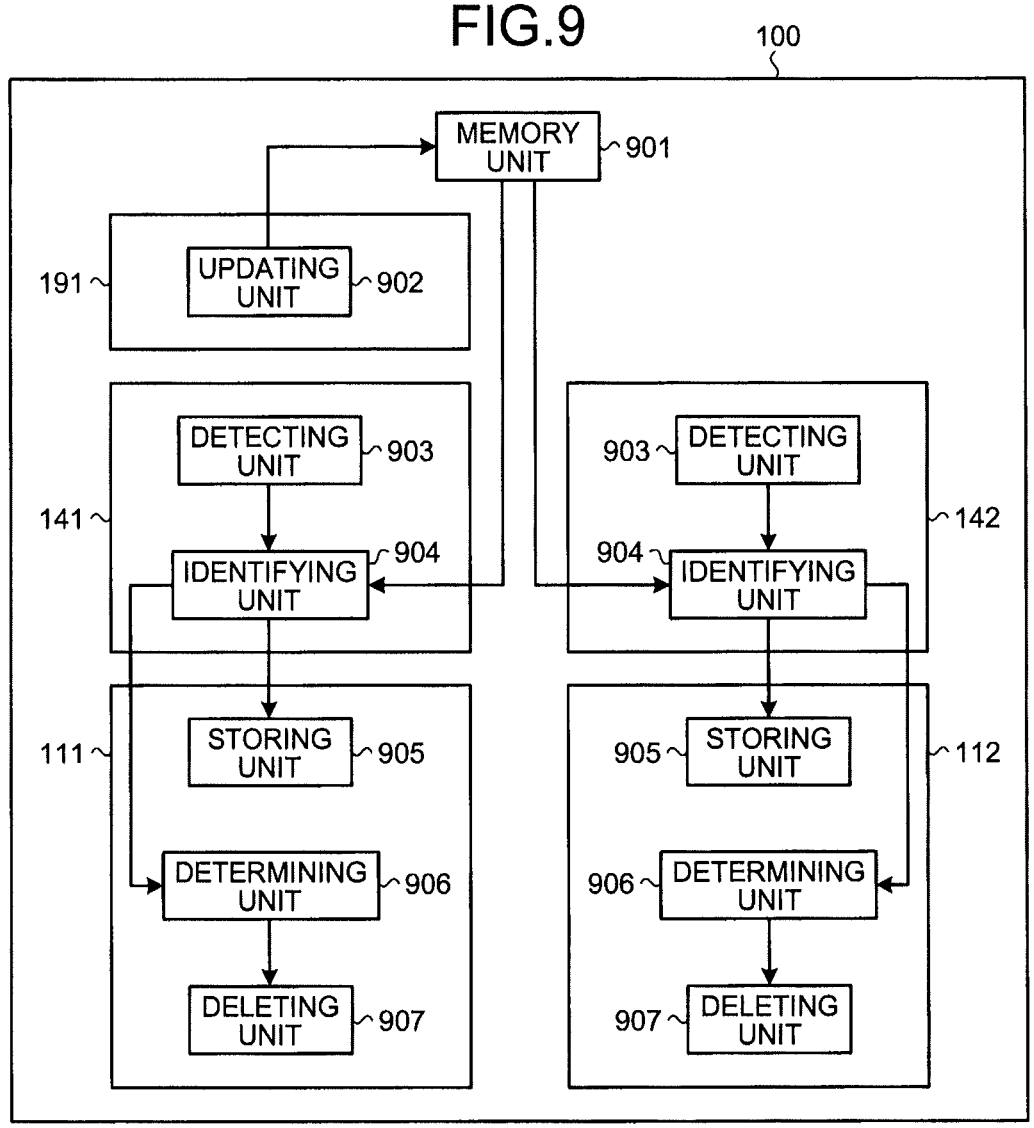
FIG. 9 is a functional block diagram of the multi-core processor system 100.

FIG. 9 is a functional block diagram of the multi-core processor system 100. The multi-core processor system 100 includes a memory unit 901, an updating unit 902, a detecting unit 903, an identifying unit 904, a storing unit 905, a determining unit 906, and a deleting unit 907.

The memory unit 901 is realized, for example, through the MMU storing the conversion table 400 therein and the shared memory 104 storing the thread management table 800 therein. The updating unit 902 is defined, for example, in a control program using a programming language, etc., and the control program is incorporated in the OS 191. The CPU 101 downloads the OS 191 stored in the shared memory 104 and executes a process coded in the control program in the OS 191 to realize the updating unit 902.

The detecting unit 903 and the identifying unit 904 are functionally defined through HDL description. This HDL description is logically synthesized and is combined with logical circuit elements, etc., to realize the detecting unit 903 and the identifying unit 904 in each MMU. For example, the detecting unit 903 and the identifying unit 904 are stored in the shared memory 104, as a control program. The MMU having a function of executing a program as the CPUs 101 and 102 do, for example, may download the control program to execute a process coded in the control program. The storing unit 905, the determining unit 906, and the deleting unit 907 are realized by the distributed cache 111 and the distributed cache 112.

For each input destination thread defined as a thread to which given data is input, the memory unit 901 stores identification information of an assignment destination CPU for the input destination thread.

When assignment of an input destination thread to the multi-core processor is detected, the updating unit 902 updates in the memory unit 901, identification information of an assignment destination CPU for the thread.

The detecting unit 903 detects a request for writing given data.

The identifying unit 904 identifies the identification information updated by the updating unit 902 in the memory unit 901, based on the given data for which the writing request is detected by the detecting unit 903.

The storing unit 905 stores the given data to the distributed cache memory of the assignment destination CPU for the input destination thread. The updated identification information of the assignment destination CPU is identified among CPUs making up the multi-core processor by the identifying unit 904.

If a request issuer CPU having issued the writing request is not included in a group of assignment destination CPUs for the input destination thread, the determining unit 906 determines whether the given data is stored in the distributed cache memory of the request issuer CPU based on address information included in the given data. According to the embodiments, for example, the writing request is accompanied by a physical address and a physical address is stored in each cache line in the distributed cache memory. For example, whether the given data is stored in the distributed cache memory of the request issuer CPU is determined by whether the physical address of the writing request matches the physical address of the cache line.

If the determining unit 906 determines that the given data is stored in the distributed cache memory of the request issuer CPU, the deleting unit 907 deletes the given data in the distributed cache memory of the request issuer CPU. Deleting the given data in the distributed cache memory means, for example, invalidating the given data.

If the identifying unit 904 has not identified updated identification information, the storing unit 905 stores the given data to the distributed cache memory of the request issuer CPU having made the writing request. A case of the identifying unit 904 not having identified the updated identification information is, for example, a case of the input destination thread not being assigned.

Following the above description, the embodiments will be described in detail using examples.

Figure 10:
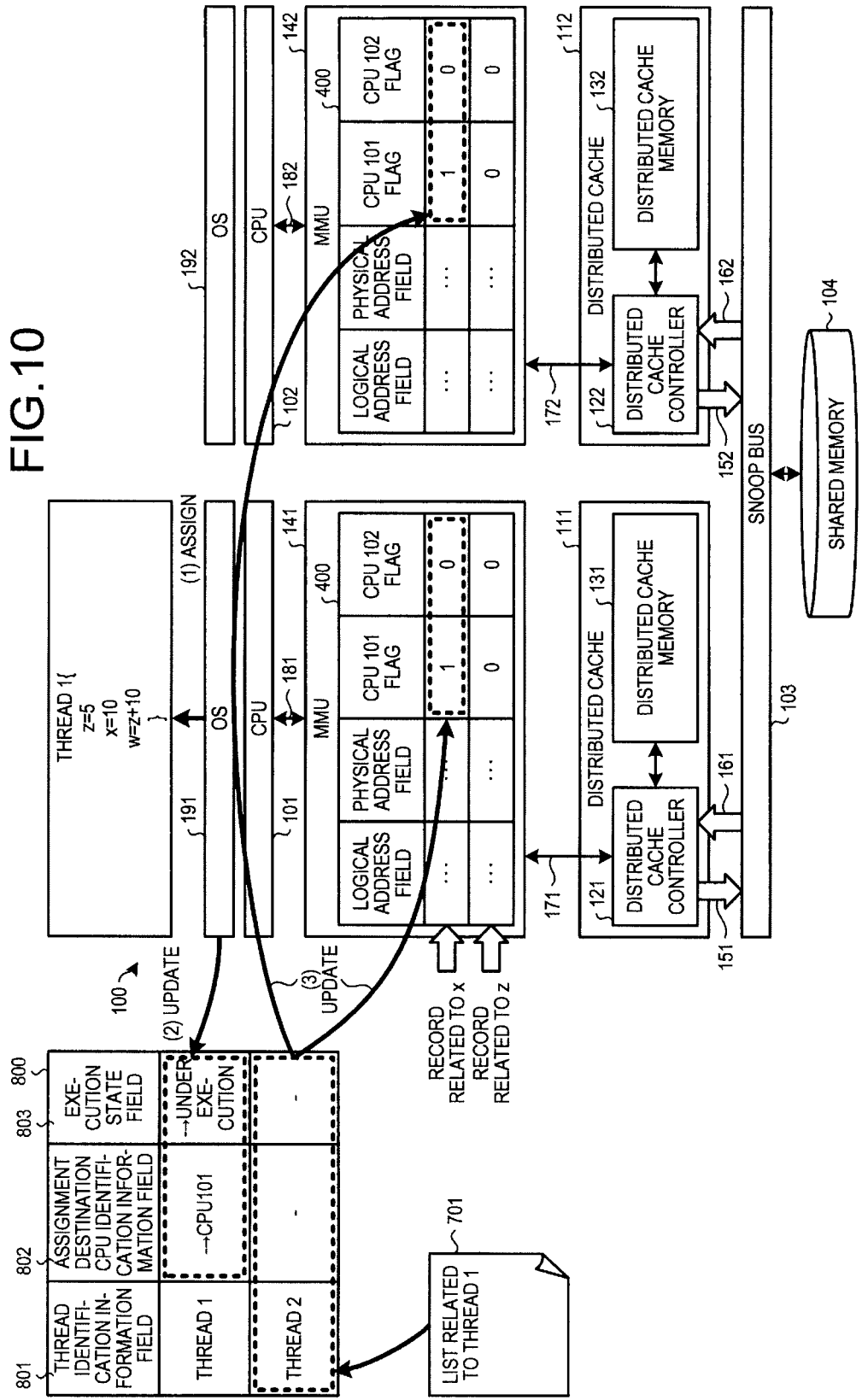
FIG. 10 is an explanatory diagram of an assignment example of a thread 1.

FIG. 10 is an explanatory diagram of an assignment example of the thread 1. When the OS 191 receives an instruction to assign the thread 1, the OS 191 refers to the thread management table 800 to check the assignment state of each CPU, and assigns the thread 1 to any one among the CPU 101 and the CPU 102. The OS 191 (1) assigns the thread 1 to the CPU 101 and thereby, detects assignment of the thread 1 to the multi-core processor.

The OS 191 then searches the thread identification information field 801 in the thread management table 800 for identification information indicating the thread 1. The OS 191 causes the updating unit 902 to (2) update identification information of an assignment destination CPU held in the assignment destination CPU identification information field 802, to "CPU 101". The OS 191 also updates execution state held in the execution state field 803, to "under execution".

The OS 191 then searches the output table 711 to check information held in the input destination thread field, in the sequence of the data held in the output data field. For the variable x, information held in the input destination thread field is "thread 2". The OS 191 searches the thread identification information field 801 in the thread management table 800 for identification information indicating the thread 2, and searches for identification information of an assignment destination CPU held in the assignment destination CPU identification information field 802 for the thread 2. In this example, the identification information of the assignment destination CPU for the thread is found to be "-".

Because the thread 2 as an input destination for the variable 2 is not assigned, the OS 191 (3) updates the CPU 101 flag in the conversion table 400, to 1. This means that when an input destination thread for given data is not assigned, the given data is stored in the memory of a request issuer CPU having issued a writing request. In this manner, the given data can be stored in the distributed cache of at least one CPU and the areas of the distributed caches of other CPUs can be utilized effectively.

According to the embodiments, when the assignment destination CPU for the input destination thread is unknown (when the input destination thread is not assigned), the CPU 101 flag for the output origin thread for the variable x is raised. This is, however, not the only case. For example, every CPU flag may be raised or the variable x may be written directly to the shared memory 104 without raising any CPU flag. The OS 191 performs the same process on the variable z as the above process performed on the variable x and thus, updates the CPU 101 flag on the record for the variable z in the conversion table 400, to 1.

In the example of FIG. 10, the OS updates a CPU flag in the conversion table 400 each time thread assignment occurs. This is, however, not the only case. For example, the OS 191 may update a CPU flag in the conversion table 400 when a writing request is issued.

Figure 11:
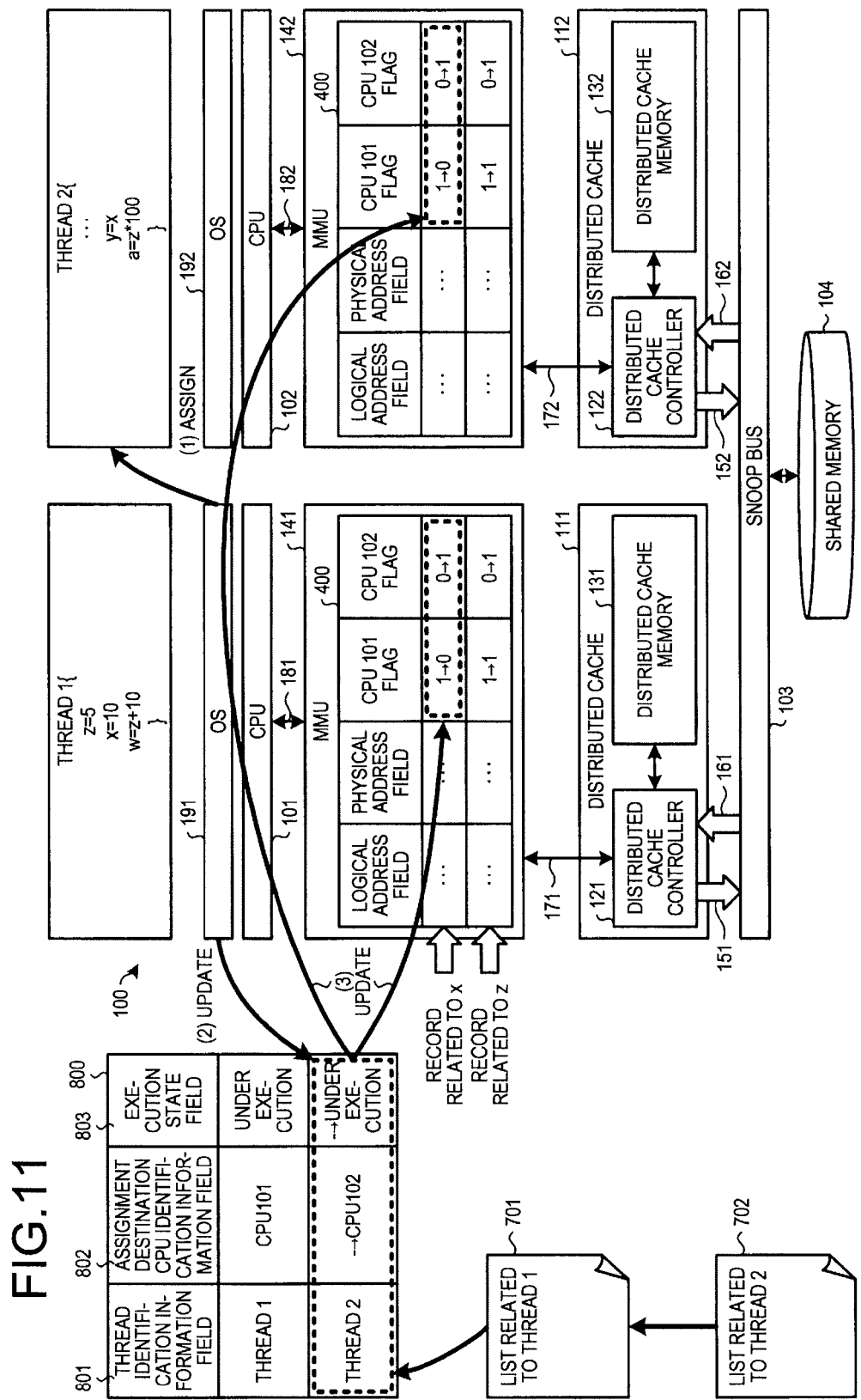
FIG. 11 is an explanatory diagram of an assignment example of a thread 2.

FIG. 11 is an explanatory diagram of an assignment example of the thread 2. When the OS 191 receives an instruction to assign the thread 2, the OS 191 refers to the thread management table 800 to check the assignment state of each thread, and assigns the thread 2 to any one among the CPU 101 and the CPU 102. The OS 191 (1) assigns the thread 2 to the CPU and thereby, detects assignment of the thread 2.

The OS 191 then searches the thread identification information field 801 in the thread management table 800 for identification information indicating the thread 2. The OS 191 (2) updates identification information of an assignment destination CPU held in the assignment destination CPU identification information field 802 in the record in which the thread identification information field 801 holds identification information indicating the thread 2, to "CPU 102". The OS 191 then (2) updates the execution state held in the execution state field 803 in the record in which the thread identification information field 801 holds identification information indicating the thread 2, to "under execution".

Subsequently, the OS 191 acquires the output table 712 from the list 702 related to the thread 2. The OS 191 then searches the input table 712 to check identification information of an input destination thread held in the input destination thread field, in the sequence of output data held in the output data field. A process of updating the conversion table 400 for the variables y and a that are output data in the thread 2 is the same as the process of updating for the variable x described with reference to FIG. 10, and is therefore omitted in further description.

Subsequently, the OS 191 acquires the output table 722 from the list 702 related to the thread 2. The OS 191 then searches the input table 722 to check identification information of an output origin thread held in the output origin thread field, in the sequence of input data held in the input data field. In this example, an output origin thread for the variables x and z that are input data in the thread 2 is the thread 1. The search result is, therefore, the thread 1. The OS 191 then acquires an output table for the retrieved output origin thread, that is, acquires the output table 711 from the list 701 related to the thread 1.

The OS 191 searches the input table 711 to check identification information of an input destination thread held in the input destination thread field, in the sequence of output data held in the output data field. A process of updating the conversion table 400 for the variables x and z that are output data in the thread 1 is the same as the process of updating for the variable x described with reference to 10, and is therefore omitted in further description. Hence, (3) a CPU flag for the record related to the variable x in the conversion table 400 is updated.

Figure 12:
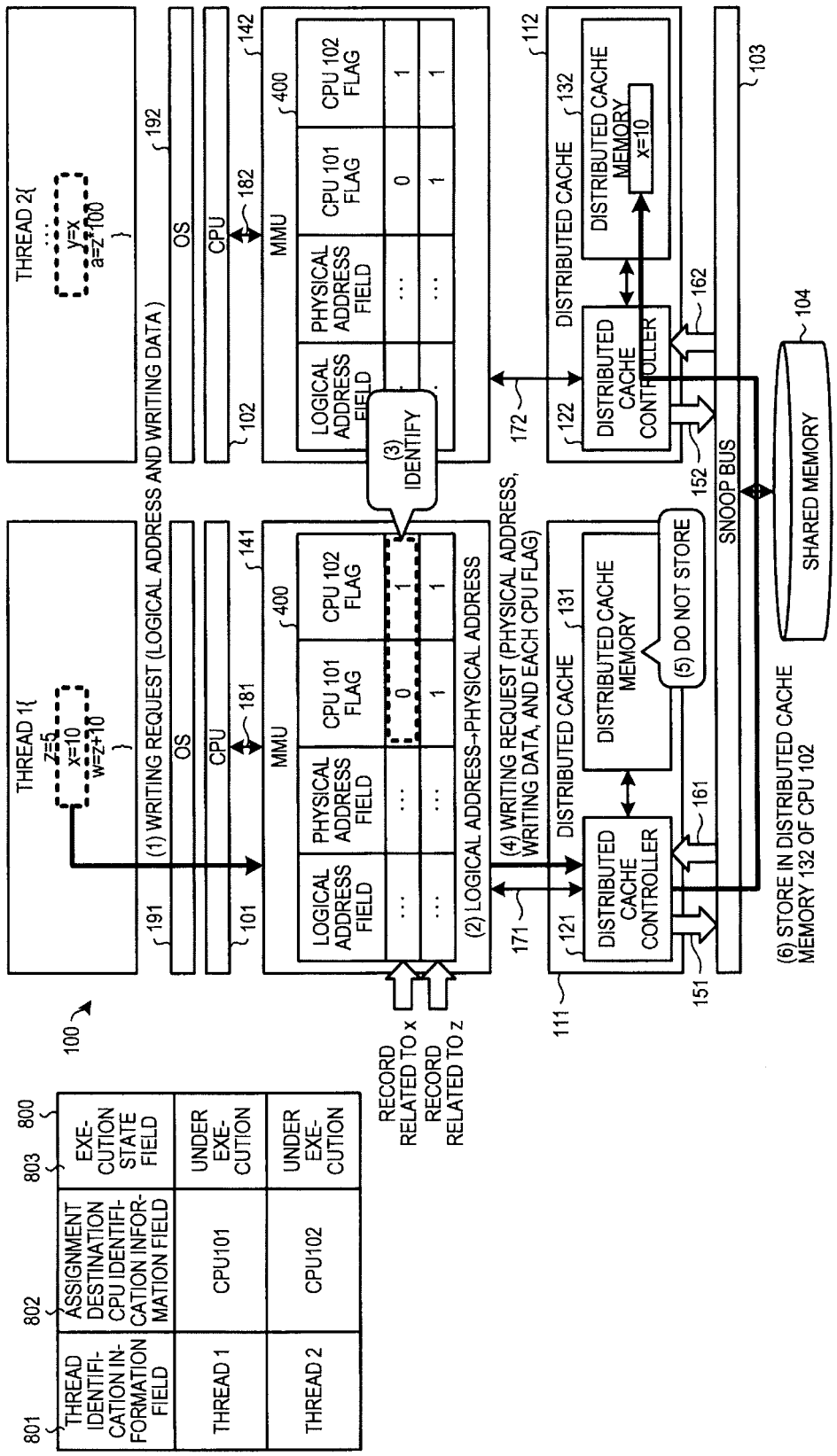
FIG. 12 is an explanatory diagram of an example of storing a variable x.

FIG. 12 is an explanatory diagram of an example of storing the variable x. When a request for writing the variable x arises in the thread 1, the OS 191 detects the writing request, and (1) sends the writing request accompanied by a logical address and writing data, to the MMU 141. The MMU 141 causes the detecting unit 903 to search logical addresses held in the logical address field 401 in the conversion table 400 for the logical address identical to the logical address accompanying the received writing request. The MMU 141 then searches for a physical address held in the physical address field 402 and corresponding to the retrieved logical address, and thereby (2) converts the logical address into the physical address.

The MMU 141 then causes the identifying unit 904 to read a CPU flag corresponding to the retrieved logical address in the conversion table 400, and thereby (3) identifies an assignment destination CPU for an input destination thread for the variable x. The CPU flag corresponding to the retrieved logical address is the CPU flag in a record including the retrieved logical address. The MMU 141 appends the physical address, the writing data, and each CPU flag to the writing request and sends the writing request to the distributed cache controller 121.

When receiving the writing request, the distributed cache controller 121 refers to each CPU flag, and stores the writing data to a CPU indicated by a CPU flag of 1. In this example, the CPU flag 101 is 0 while the CPU 102 flag is 1. The distributed cache controller 121, therefore, causes the storing unit 905 to (5) store the writing data not to the distributed cache memory 131 of the CPU 101 but (6) to the distributed cache memory 132 of the CPU 102.

Figure 13:
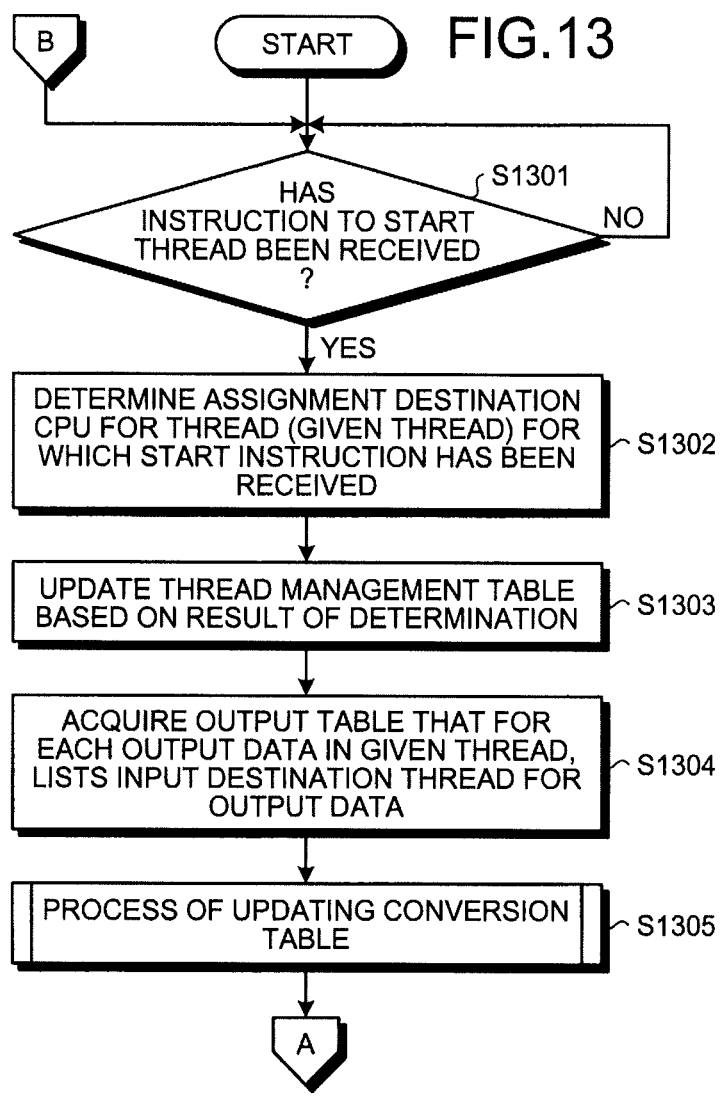
FIG. 13 is a flowchart of an updating procedure by an OS 191 (part 1)
Figure 14:
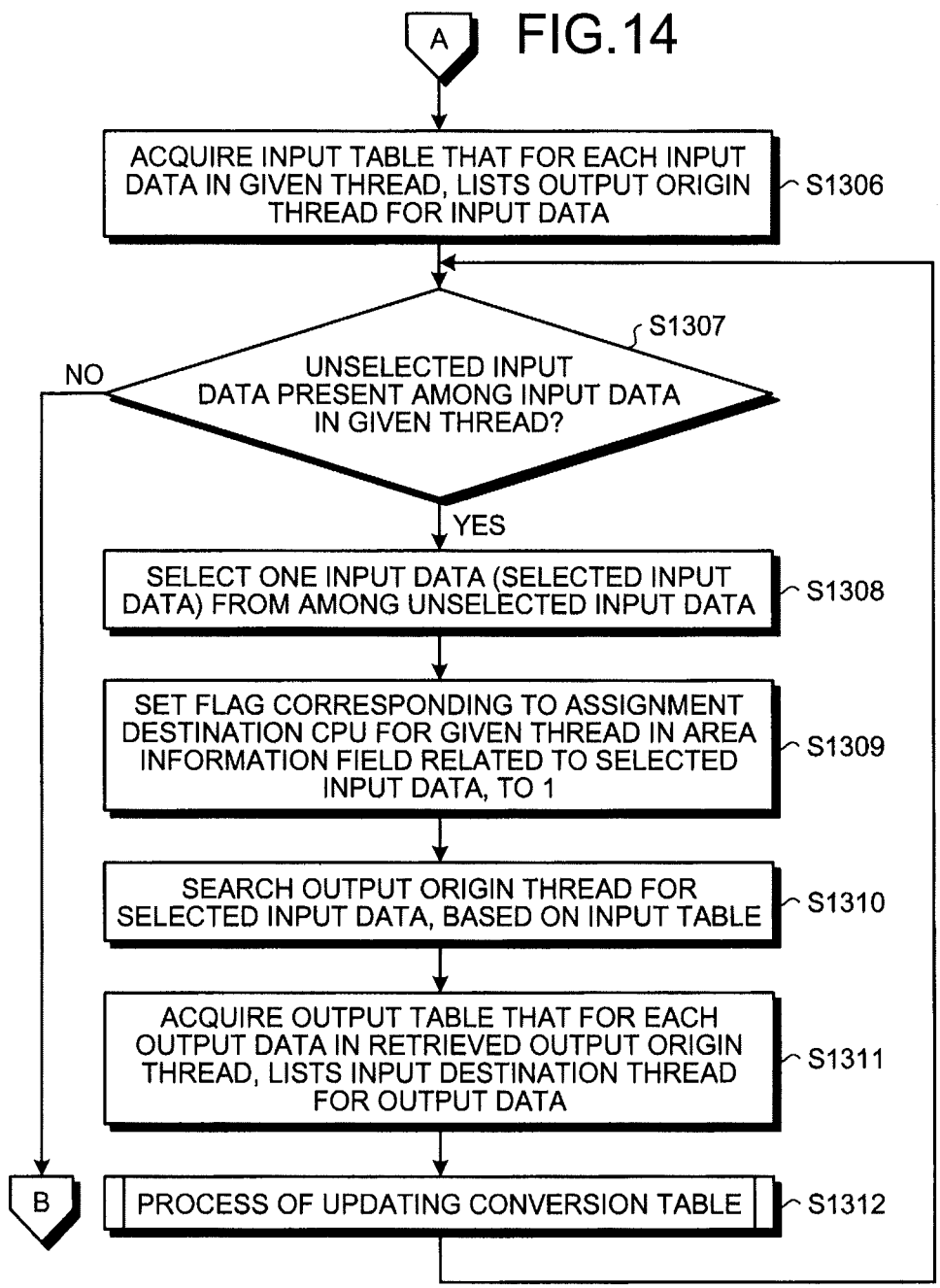
FIG. 14 is a flowchart of an updating procedure by an OS 191 (part 2)

FIGS. 13 and 14 are flowcharts of an updating procedure by the OS 191. The OS 191 determines whether an instruction to start a thread has been received (step S1301). Upon determining that an instruction to start the thread has not been received (step S1301: NO), the OS 191 returns to step S1301. Upon determining that an instruction to start the thread has been received (step S1301: YES), the OS 191 determines an assignment destination CPU for the thread (given thread) for which the start instruction has been received (step S1302).

The OS 191 causes the updating unit 902 to update the thread management table 800 based on the result of the determination (step S1303). The OS 191 acquires an output table that for each output data in the given thread, lists an input destination thread for the output data (step S1304), and causes the updating unit 902 to execute a process of updating the conversion table 400 (step 1305).

The OS 191 acquires an input table that for each input data in the given thread, lists an output origin thread for the input data (step S1306), and determines whether unselected input data is present among all the input data in the given thread (step S1307). Upon determining that unselected input data is present (step S1307: YES), the OS 191 selects one input data (selected input data) from among the unselected input data (step S1308).

The OS 191 then sets a flag corresponding to an assignment destination CPU for the given thread in the area information field related to the selected input data, to 1 (step S1309). The OS 191 searches for an output origin thread for the selected input data, based on the input table (step S1310), and acquires the output table that for each output data in the retrieved output origin thread, lists an input destination thread for the output data (step S1311). The OS 191 causes the updating unit 902 to execute the process of updating the conversion table 400 (step S1312), and returns to step S1307.

At step S1307, if the OS 191 determines that no unselected data is present among the entire input data in the given thread (step S1307: NO), the OS 191 returns to step S1301.

Figure 15:
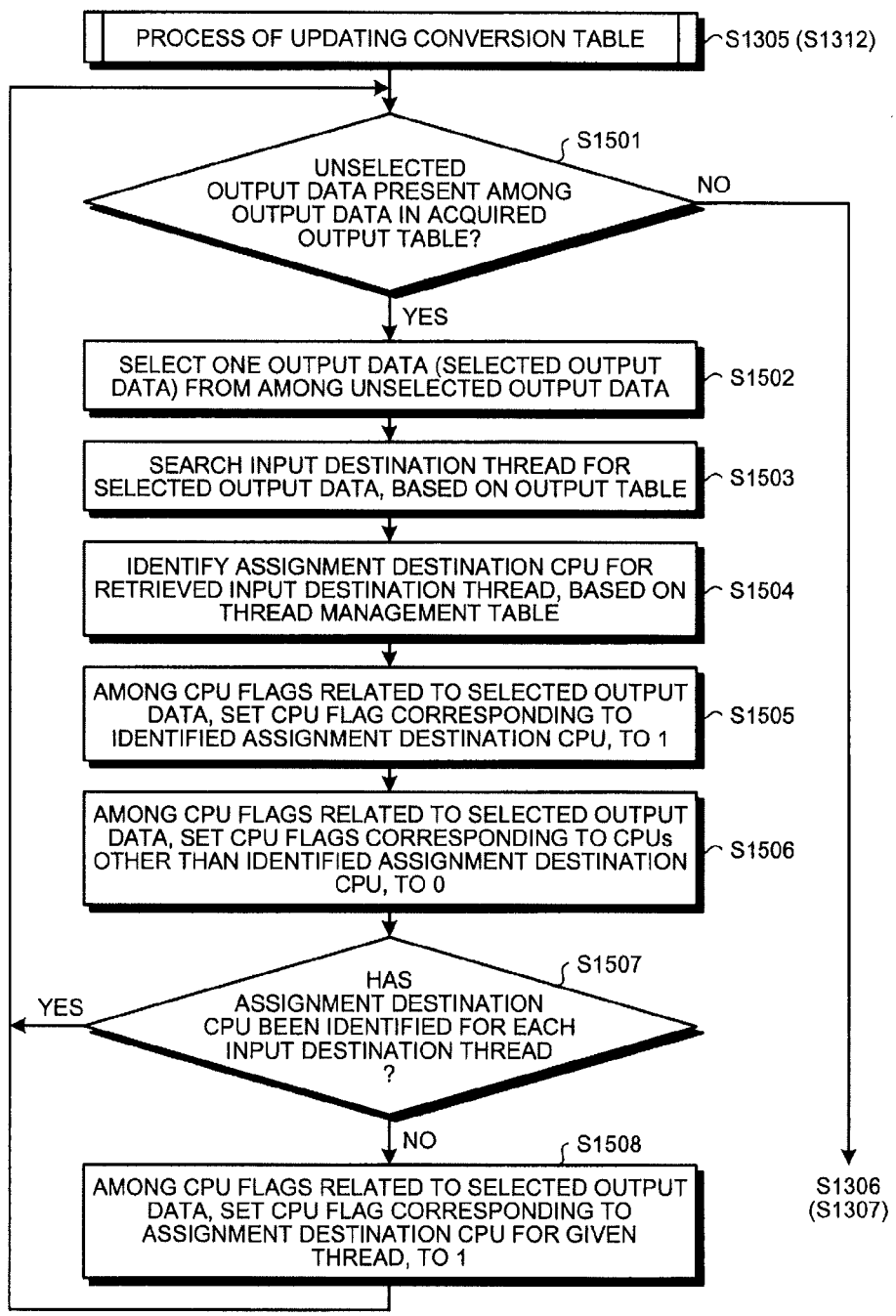
FIG. 15 is a flowchart of the process of updating the conversion table depicted in FIGS. 13 and 14 (step S1305 or step S1312)

FIG. 15 is a flowchart of the process of updating the conversion table depicted in FIGS. 13 and 14 (step S1305 or step S1312). The OS 191 determines whether unselected output data is present among all the output data in the acquired output table (step S1501). Upon determining that unselected output data is present among all the output data in the acquired output table (step S1501: YES), the OS 191 selects one output data (selected output data) from among the unselected output data (step S1502).

The OS 191 searches for an input destination thread for the selected output data, based on the output table (step S1503), and identifies an assignment destination CPU for the retrieved input destination thread, based on the thread management table 800 (step S1504). The OS 191 sets a CPU flag corresponding to the identified assignment destination CPU among CPU flags related to the selected output data, to 1 (step S1505).

The OS 191 then sets CPU flags corresponding to CPUs other than the identified assignment destination CPU among the CPU flags related to the selected output data, to 0 (step S1506), and determines whether an assignment destination CPU for each input destination thread has been identified (step S1507). Upon determining that an assignment destination CPU for each input destination thread has been identified (step S1507: YES), the OS 191 returns to step S1501.

Upon determining that an assignment destination CPU has not been identified for each input destination thread (step S1507: NO), the OS 191 sets a CPU flag corresponding to an assignment destination CPU for the given thread among the CPU flags related to the selected output data, to 1 (step S1508). In this manner, the given data can be stored to the distributed cache of at least one CPU and the areas of the distributed caches of other CPUs can be utilized effectively. Following step S1508, the OS 191 returns to step S1501.

If the OS 191 determines that no unselected data is present among all the output data in the acquired output table (step S1501: NO), the OS 191 returns to step S1306 (step S1307).

Figure 16:
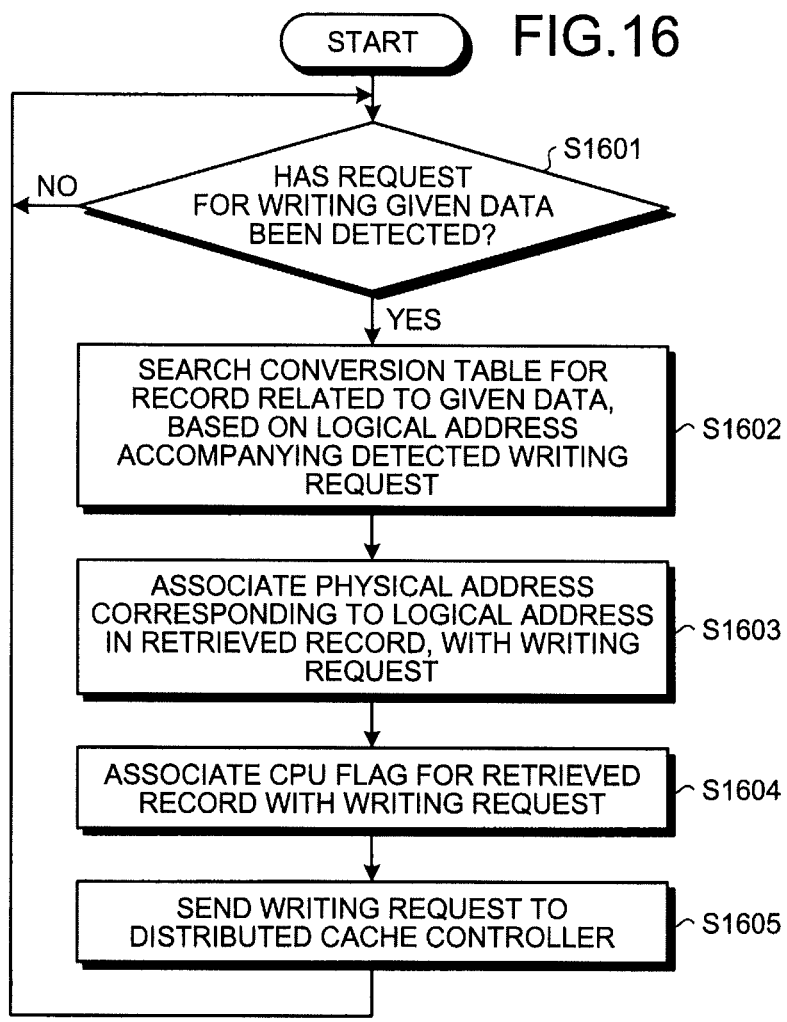
FIG. 16 is a flowchart of an identifying procedure by each MMU.

FIG. 16 is a flowchart of an identifying procedure by each MMU. The MMU determines whether a request for writing given data has been detected through the detecting unit 903 (step S1601). Upon determining that a request for writing given data has not been detected (step S1601: NO), the MMU returns to step S1601.

Upon determining that a request for writing given data has been detected (step S1601: YES), the MMU causes the identifying unit 904 to search the conversion table 400 for a record related to the given data, based on a logical address accompanying the detected writing request (step S1602).

The MMU associates a physical address corresponding to the logical address in the retrieved record, with the writing request (step S1603).

The MMU causes the identifying unit 904 to associate a CPU flag for the retrieved record with the writing request (step S1604), sends the writing request to the distributed cache controller (step S1605), and returns to step S1601.

Figure 17:
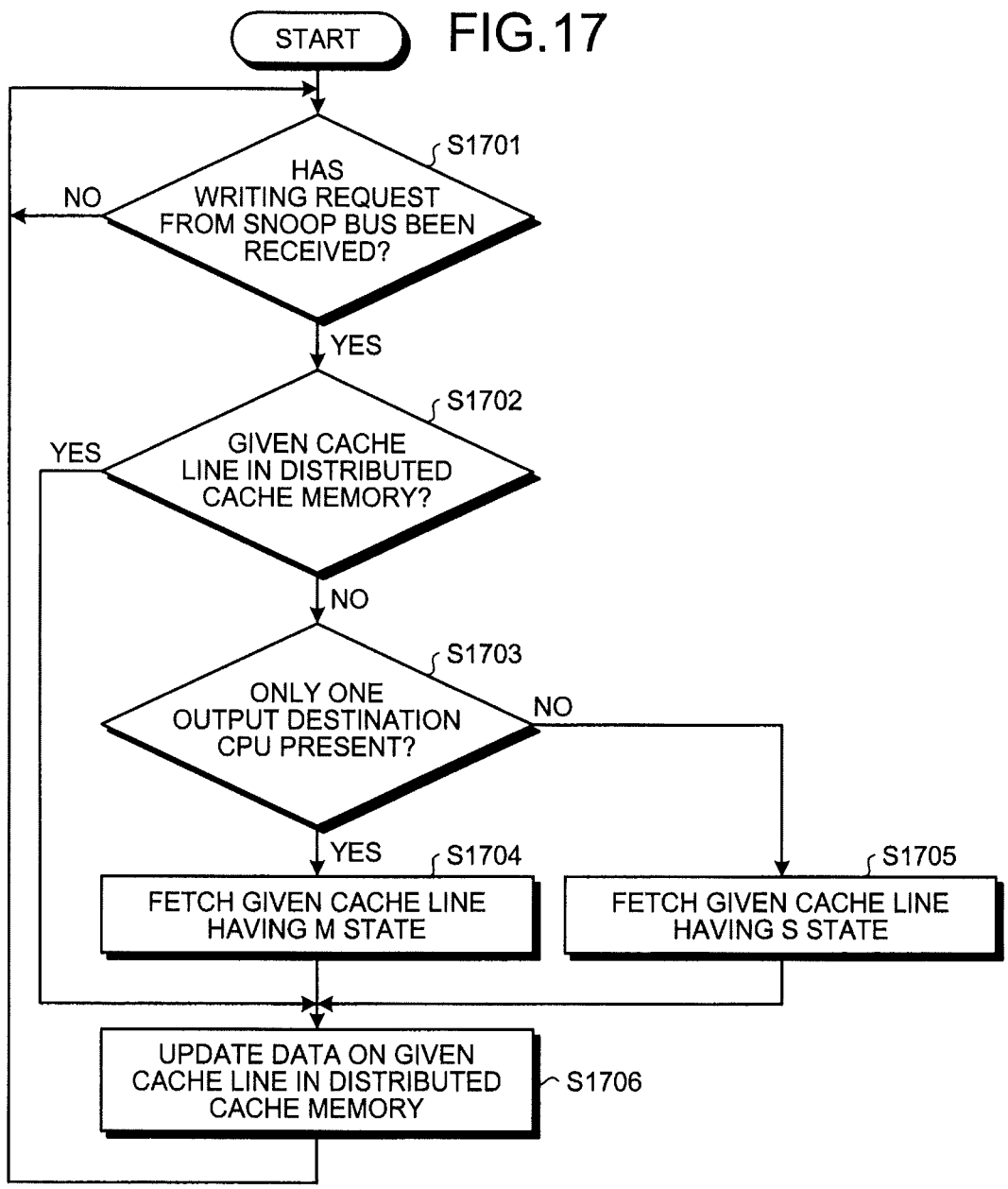
FIG. 17 is a flowchart of a storing procedure by a distributed cache controller (in response to a writing request from the snoop bus 103)

FIG. 17 is a flowchart of a storing procedure by the distributed cache controller (in response to a writing request from the snoop bus 103). The distributed cache controller determines whether a writing request from the snoop bus 103 has been received (step S1701). Upon determining that a writing request from the snoop bus 103 has not been received (step S1701: NO), the distributed cache controller returns to step S1701.

Upon determining that a writing request from the snoop bus 103 has been received (step S1701: YES), the distributed cache controller proceeds to step S1702. At step S1702, the distributed cache controller determines whether a given cache line is in the distributed cache memory corresponding to the distributed cache controller (step S1702). Upon determining that the given cache line is not in the distributed cache memory corresponding to the distributed cache controller (step S1702: NO), the distributed cache controller determines whether only one output destination CPU is present (step S1703).

Upon determining that only one output destination CPU is present (step S1703: YES), the distributed cache controller fetches the given cache line having the M state (step S1704). Fetching the given cache line having the M state means fetching the given cache line having STATE of the tag information set to M state. Upon determining that more than one output destination CPU is present (step S1703: NO), the distributed cache controller fetches the given cache line having the S state (step S1705). Fetching the given cache line having the S state means fetching the given cache line having STATE of the tag information set to S state.

Following step S1704 or step S1705, the distributed cache controller updates data on the given cache line in the distributed cache memory corresponding to the distributed cache controller (step S1706), and returns to step S1701. Upon determining that the given cache line is in the distributed cache memory corresponding to the distributed cache controller (step S1702: YES), the distributed cache controller proceeds to step S1706.

Figure 18:
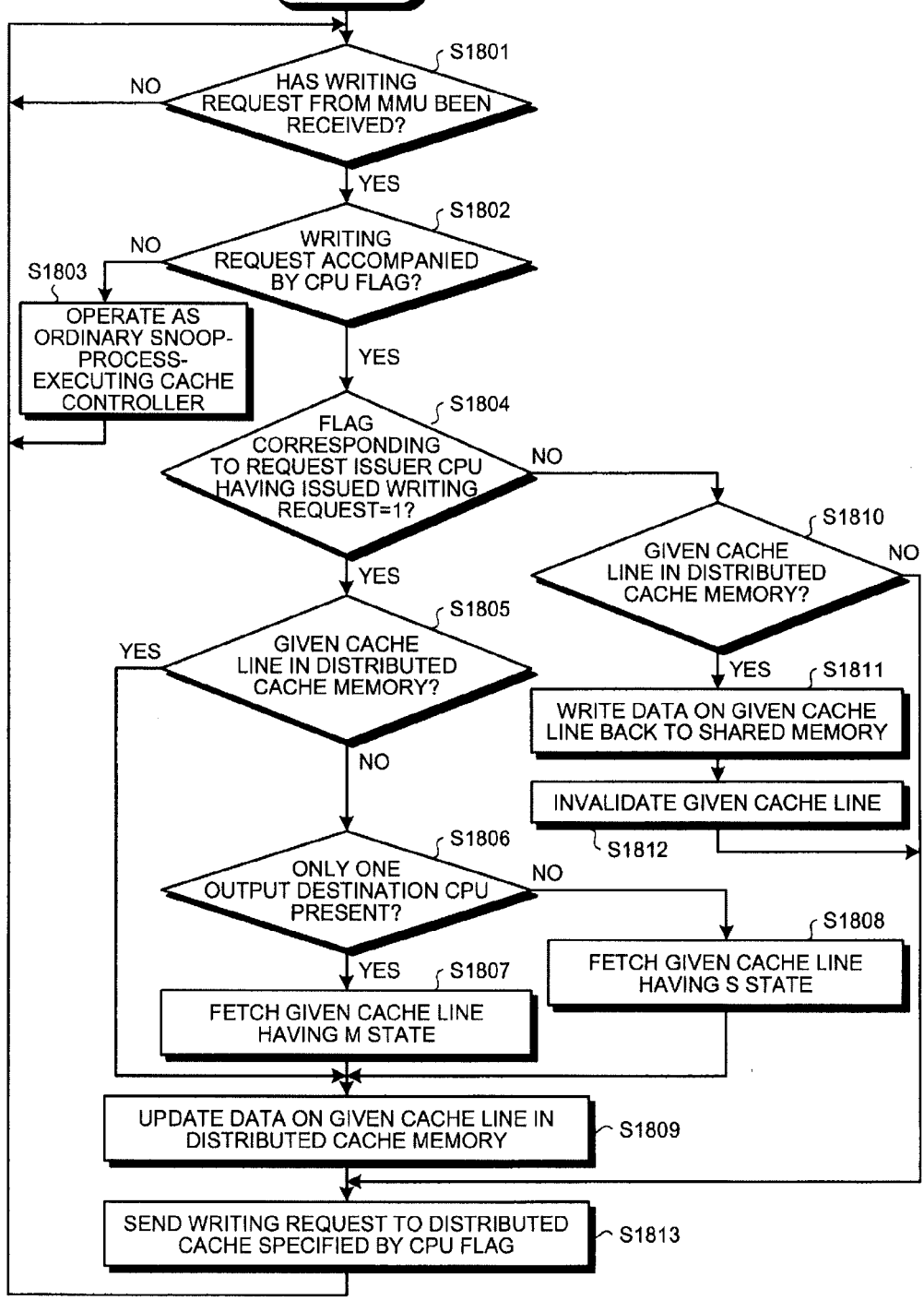
FIG. 18 is a flowchart of a storing procedure by the distributed cache controller (in response to a writing request from the MMU)

FIG. 18 is a flowchart of a storing procedure by the distributed cache controller (in response to a writing request from the MMU). The distributed cache controller determines whether a writing request from the MMU has been received (step S1801). Upon determining that a writing request from the MMU has not been received (step S1801: NO), the distributed cache controller returns to step S1801.

When determining that it has received a writing request from the MMU (step S1801: YES), the distributed cache controller determines whether the writing request is accompanied by a CPU flag (step S1802). Upon determining that the writing request is not accompanied by a CPU flag (step S1802: NO), the distributed cache controller operates as an ordinary snoop-process-executing cache controller (step S1803), and returns to step S1801.

Operating as an ordinary snoop-process-executing cache controller means determining whether a given cache line is stored in the distributed cache memory based on tag information and if the given cache line is stored therein, updating the given cache line. If the given cache line is not stored in the distributed cache memory, the given cache line is fetched and stored to the distributed cache memory. The distributed cache controller of each CPU is notified of the storage of the given cache line.

At step S1802, if the distributed cache controller determines that the writing request is accompanied by a CPU flag (step S1802: YES), the distributed cache controller causes the determining unit 906 to determine whether a flag corresponding to a request issuer CPU having issued the writing request is 1 (step S1804). If the flag corresponding to the request issuer CPU having issued the writing request is 1 (step S1804: YES), the distributed cache controller determines whether the given cache line is in the distributed cache memory (step S1805).

Upon determining that the given cache line is not in the distributed cache memory (step S1805: NO), the distributed cache controller determines whether only one output destination CPU is present (step S1806). Upon determining that only one output destination CPU is present (step S1806: YES), the distributed cache controller fetches the given cache line having the M state (step S1807).

Upon determining that more than one output destination CPU is present (step S1806: NO), the distributed cache controller fetches the given cache line having the S state (step S1808). Following step S1807 or step S1808, the distributed cache controller updates data on the given cache line in the distributed cache memory (step S1809).

Upon determining at step S1805 that the given cache line is present in the distributed cache memory (step S1805: YES), the distributed cache controller proceeds to step S1809.

At step S1804, if the flag corresponding to the request issuer CPU having issued the writing request is not 1 (step S1804: NO), the distributed cache controller determines whether the given cache line is in the distributed cache memory (step S1810).

Upon determining that the given cache line is in the distributed cache memory (step S1810: YES), the distributed cache controller writes data on the given cache line back to the shared memory 104 (step S1811). The distributed cache controller then causes the deleting unit 907 to invalidate the given cache line (step S1812). Invalidating the given cache line means setting STATE of the given cache line to the I state. Setting STATE to the I state is equivalent to deleting the given cache line.

At step S1810, if the distributed cache controller determines that the given cache line is not in the distributed cache memory (step S1810: NO), the distributed cache controller proceeds to step S1813. Following step S1809, NO at step S1810, or step S1812, the distributed cache controller sends the writing request to a distributed cache specified by the CPU flag (step S1813), and returns to step S1801.

A multichannel audio decoder is cited as a specific application. The multichannel audio decoder executes a process of decoding audio data to output decoded data.

One unit of compressed audio data is decoded. The decoding result at each channel, from channels 1 to 7, is data of 4 kilobytes (KB). The decoding result at each channel is subjected to a filtering process and a pulse code modulation (PCM) process for filtering, processing, and synthesizing.

The audio data subjected to the filtering process and PCM process is collected from each channel, and the collected audio data is subjected to a down mix process according to the number of channels of a playback device (speaker) incorporated in an apparatus. The audio data subjected to the down mix process is then output to the playback device. Since one unit of audio data requires about several tens of milliseconds for reproduction, the multichannel audio decoder repeats cycles of executing the decoding process, filtering process, and PCM process on the next unit of audio data while outputting preceding unit data to the playback device and thereby plays back audio data that consumes a long time for playback.

Because the filtering process and PCM process are executable at each channel, in playing back multichannel audio data, a multi-core processor can execute the filtering process and PCM process at each channel through parallel processing.

Figure 19:
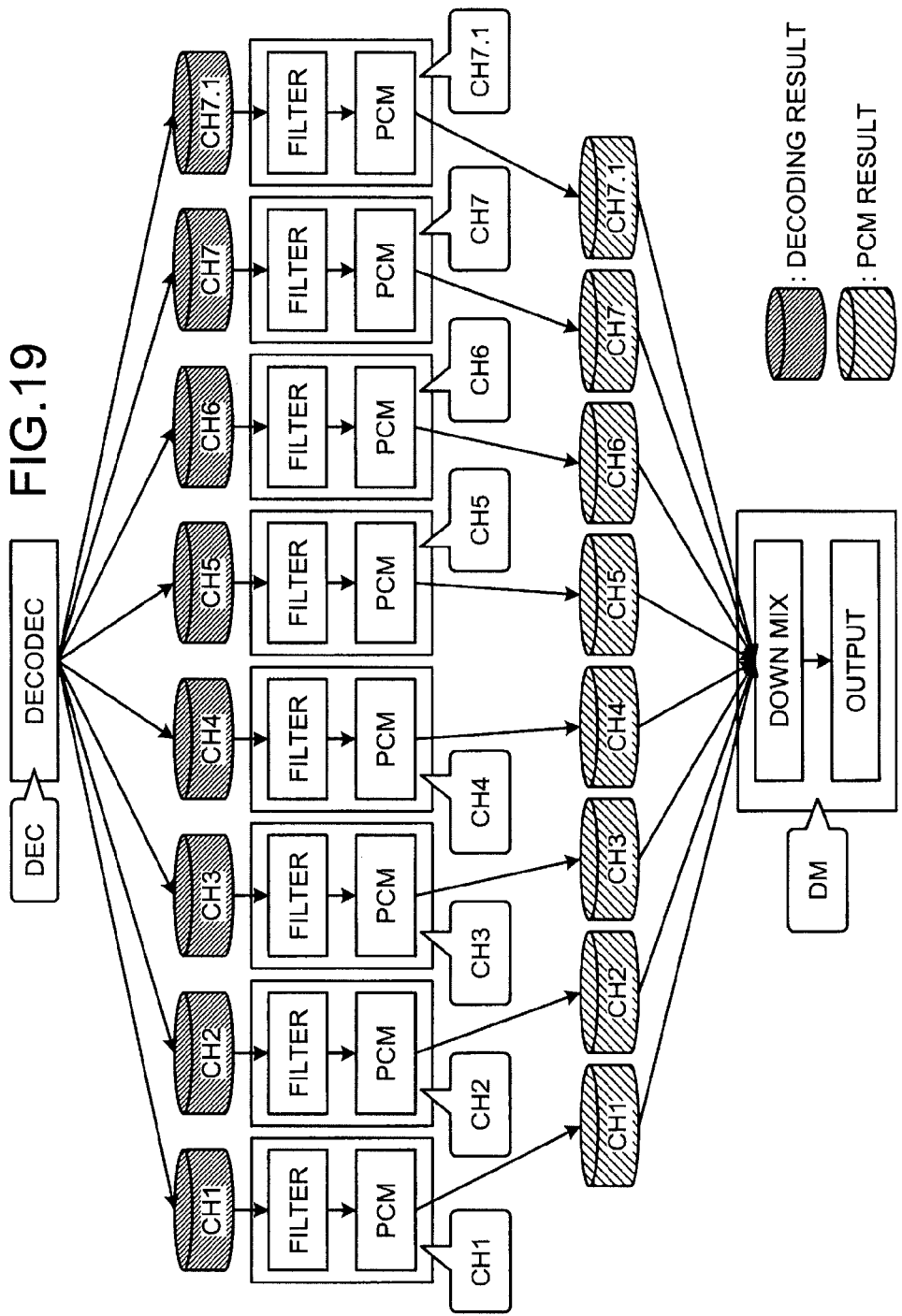
FIG. 19 is an explanatory diagram of one example of an application.

FIG. 19 is an explanatory diagram of one example of an application. This example depicted in FIG. 19 is given as an example in which threads are divided into a thread for the decoding process, threads for the filtering process and PCM process at individual channels, and a thread for the down mix process and output process. The thread for executing the decoding process is a thread DEC, the threads for executing the filtering process and PCM process are threads CH1 to CH7 and CH7.1, and the thread for executing the down mix process and output process is a thread DM.

The thread DEC outputs decoded audio data (decoding result) for all channels. The threads CH1 to CH7 and CH7.1 each receive input of decoded audio data (decoding result) for one channel and each output processed audio data (PCM result) for one channel. The thread DM receives input of processed audio data for all channels.

Figure 20:
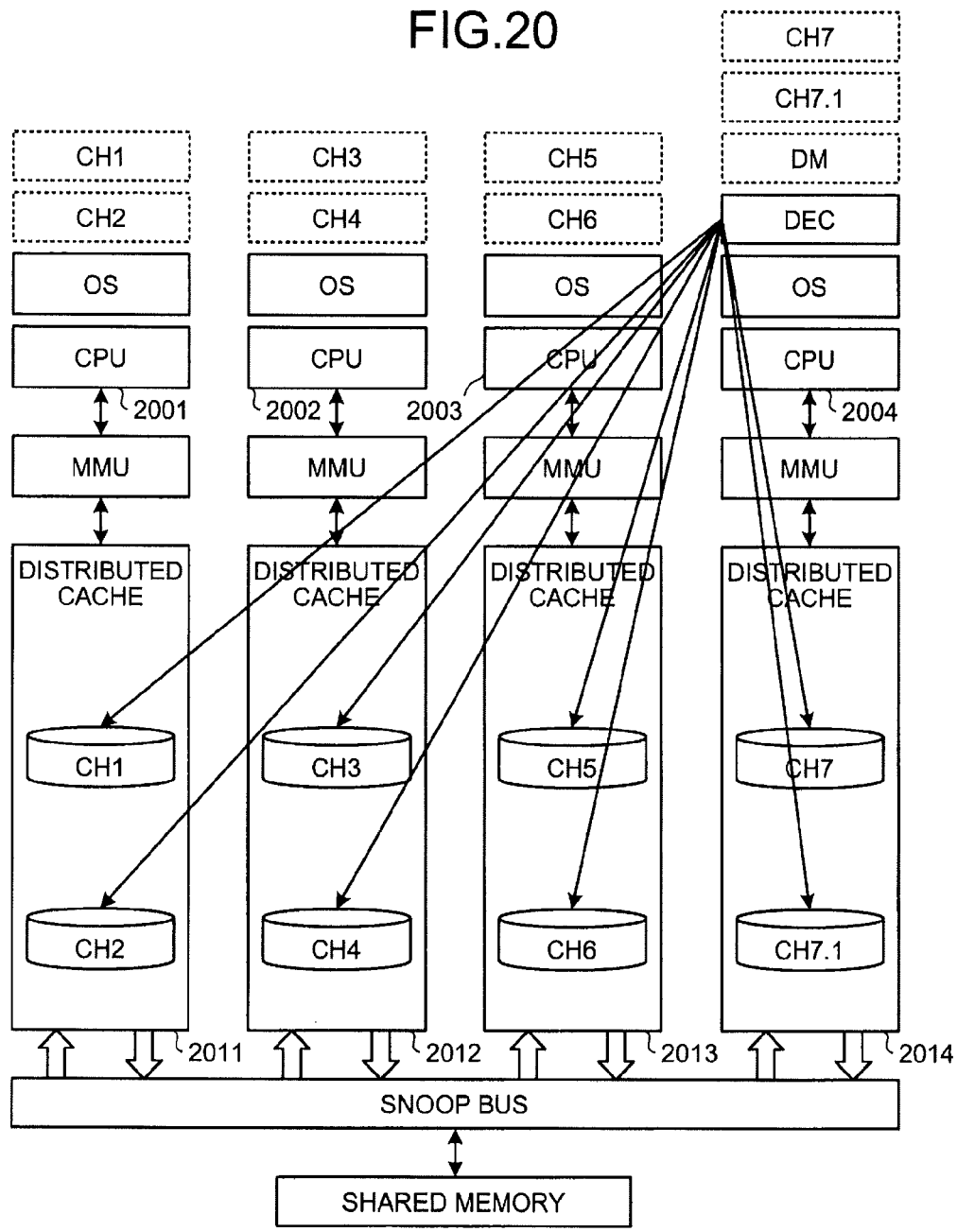
FIG. 20 is an explanatory diagram of an example of storage of decoding results.

FIG. 20 is an explanatory diagram of an example of storage of decoding results. In FIG. 20, the threads CH1 and CH2 are assigned to a CPU 2001, and the threads CH3 and CH4 are assigned to a CPU 2002. The threads CH5 and CH6 are assigned to a CPU 2003, and the threads CH7, CH7.1, DEC, and DM are assigned to a CPU 2004. In this example, only the thread DEC (indicated by a continuous line in FIG. 20) is being executed, while other threads (indicated by broken lines in FIG. 20) are all standing by for execution.

When the multi-core processor system of FIG. 20 includes the memory unit 901 to the storing unit 905, decoding results to be input to the threads CH1 and CH2 among the decoding results from the thread DEC are output only to the distributed cache 2011 of the CPU 2001. Decoding results to be input to the threads CH3 and CH4 among the decoding results from the thread DEC are output only to the distributed cache 2012 of the CPU 2002.

Decoding results to be input to the threads CH5 and CH6 among the decoding results from the thread DEC are output only to the distributed cache 2013 of the CPU 2003. Decoding results to be input to the threads CH7 and CH7.1 among the decoding results from the thread DEC are output only to the distributed cache 2014 of the CPU 2004.

In FIG. 20, although arrows come out from the thread DEC to reach the decoding results in the distributed cache 2013, in the distributed cache 2012, and in the distributed cache 2011, in actuality, the decoding result is stored to each distributed cache via the MMU of the CPU 2004, the distributed cache controller in the distributed cache 2014, and the snoop bus.

Figure 21:
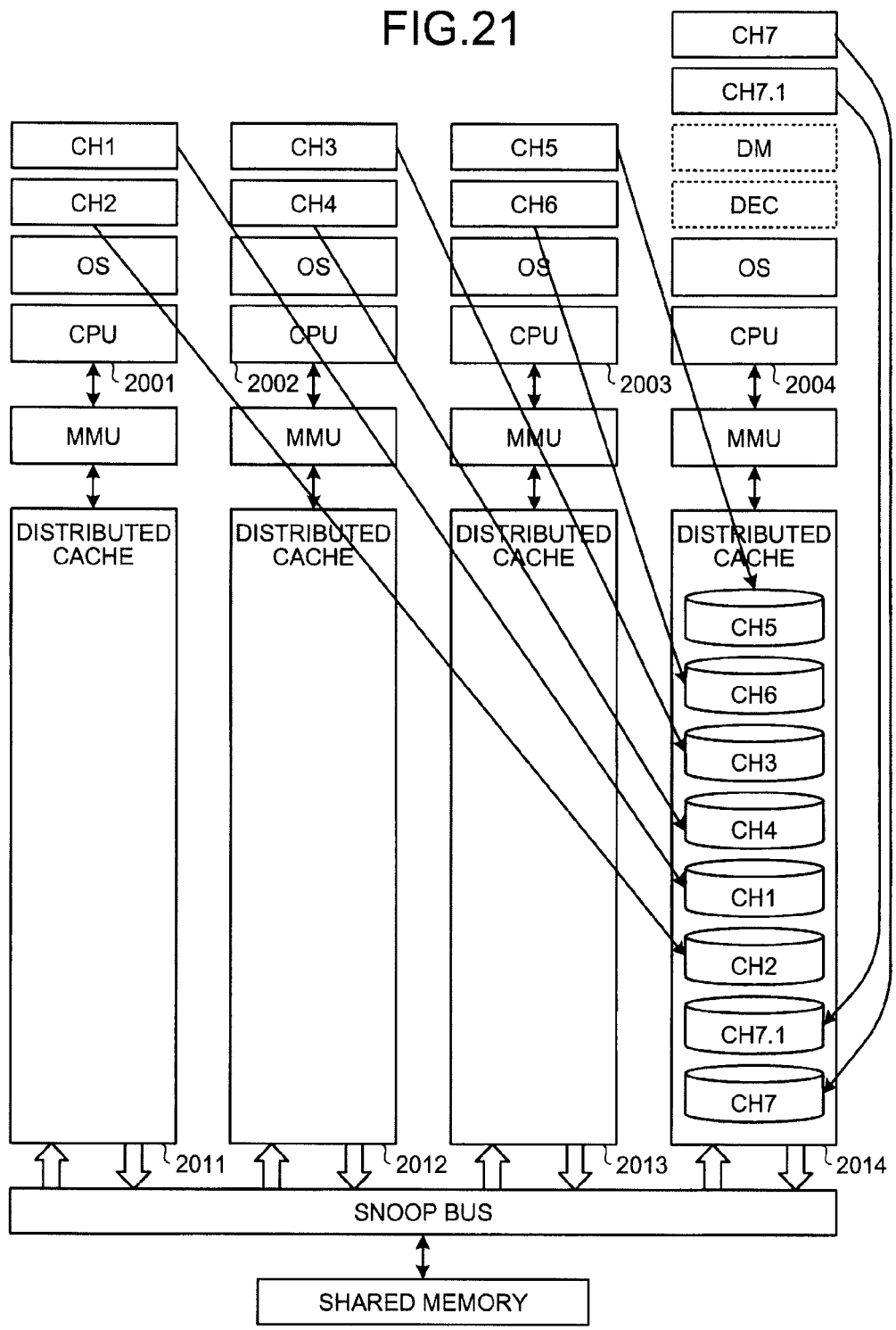
FIG. 21 is an explanatory diagram of an example of storage of PCM results.

FIG. 21 is an explanatory diagram of an example of storage of PCM results. The threads CH1 to CH7 and CH7.1 (indicated by continuous lines in FIG. 21) are being executed, while the threads DEC and DM (indicated by broken lines in FIG. 21) are standing by for execution. When the multi-core processor system of FIG. 21 includes the memory unit 901 to the storing unit 905, each PCM result is used at the thread DM. For this reason, each PCM result is stored only in the distributed cache of the CPU to which the thread DM is assigned.

In FIG. 21, although an arrow comes out of each thread for each channel to reach each PCM result in the distributed cache 2014, in actuality, each PCM result is stored to the distribute cache 2014 via the MMU of a CPU to which each thread for each channel is assigned, the distributed cache controller in the distributed cache of the CPU, and the snoop bus.

As described, according to the multi-core processor system, the control program, and the control method, given data is stored only in the distributed cache of an assignment destination CPU for an input destination thread using the given data as input data. As a result, the given data is not stored to the distributed cache of a CPU not requiring reading of the given data. Hence, the area of each cache can be utilized effectively without affecting speed at which the input destination thread reads out the given data.

When a request issuer CPU having issued a request for writing given data is not included in a group of assignment destination CPUs for an input destination thread, if the given data is already stored in the distributed cache of the request issuer CPU, the given data is deleted from the distributed cache of the request issuer CPU. As a result, data that is not to be read is deleted from an area occupied with such data, thereby enabling effective use of the area of the distributed cache of a CPU from which the given data is not read out.

If an input destination thread for given data is not assigned to the multi-core processor, the given data is stored to the memory of a request issuer CPU having issued a writing request. As a result, the given data can be stored in at least the distributed cache of one CPU and the areas of the distributed caches of other CPUs can be used effectively.

The multi-core processor system, the control program, and the control method offer an effect that areas of a cache can be utilized effectively without affecting the speed of data reading from the cache.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multiprocessor system comprising:
   a plurality of cores configured to execute a plurality of threads, respectively; and
   a plurality of caches configured to store, for each of the cores, data to be read when the threads are executed by the cores, respectively, wherein
   a first core of the cores is configured to:
      read first data from a first cache that is among the caches and corresponds to the first core when executing a first thread of the threads;
      assign a second core of the cores to execute a second thread that is among the threads and reads the first data; and
      write the first data into a second cache that is among the caches and corresponds to the second core.

2. A control method for a multiprocessor system that includes:
   a plurality of cores configured to execute a plurality of threads, respectively; and a plurality of caches configured to store, for each of the cores, data to be read when the threads are executed by the cores, respectively, wherein the control method causes a first core of the cores to execute a process comprising:

reading first data from a first cache that is among the caches and corresponds to the first core when executing a first thread of the threads;

assigning a second core of the cores to execute a second thread that is among the threads and reads the first data; and writing the first data into a second cache that is among the caches and corresponds to the second core.

* * * * *